(12) United States Patent
Faber et al.

(10) Patent No.: US 9,554,052 B2
(45) Date of Patent: Jan. 24, 2017

(54) SINGLE ACTION PHOTO AND VIDEO MESSAGING

(71) Applicant: Wit Dot Media Inc., San Francisco, CA (US)

(72) Inventors: Onno Gerke Tuus Faber, Az Delft (NL); Leendert Marinus van Driel, Az Delft (NL); Jorn van Dijk, Grashof (NL)

(73) Assignee: Wit Dot Media, Inc., San Francisco, CA (US)

( * ) Notice: Subject to any disclaimer, the term of this patent is extended or adjusted under 35 U.S.C. 154(b) by 0 days.

(21) Appl. No.: 14/730,134

(22) Filed: Jun. 3, 2015

(65) Prior Publication Data

US 2015/0358550 A1    Dec. 10, 2015

Related U.S. Application Data

(60) Provisional application No. 62/007,777, filed on Jun. 4, 2014.

(51) Int. Cl.
| | |
|---|---|
| *H04N 5/232* | (2006.01) |
| *H04M 1/725* | (2006.01) |
| *H04N 21/414* | (2011.01) |
| *H04N 21/4223* | (2011.01) |
| *H04N 21/4786* | (2011.01) |
| *H04N 21/4788* | (2011.01) |

(52) U.S. Cl.
CPC ..... *H04N 5/23293* (2013.01); *H04M 1/72555* (2013.01); *H04N 21/41407* (2013.01); *H04N 21/4223* (2013.01); *H04N 21/4786* (2013.01); *H04N 21/4788* (2013.01)

(58) Field of Classification Search
CPC .................................................. H04N 1/00389
USPC ........................................ 348/333.02, 207.99
See application file for complete search history.

(56) References Cited

U.S. PATENT DOCUMENTS 9,237,305 B2 *  1/2016  Guzman .................. H04N 7/15
2005/0134691 A1 *  6/2005  Cox .................... H04N 1/00307
                                                                348/207.99

* cited by examiner

*Primary Examiner* — Joel Fosselman
(74) *Attorney, Agent, or Firm* — Wilmer Cutler Pickering Hale and Dorr LLP

(57) ABSTRACT

A computer-implemented method for single-action photo and video messaging includes simultaneously displaying both a live feed representing visual data captured by a video recording device and a plurality of contact icons, each contact icon associated with one or more destinations to which media data can be sent. A single action is received from a user selecting one of the plurality of the displayed contact icons. In response to the user's single action and not based on any subsequent input from the user, the following steps are carried out automatically: capturing visual data from the video recording device, and sending, to the one or more destinations associated with the selected contact icon, the captured visual data.

13 Claims, 39 Drawing Sheets

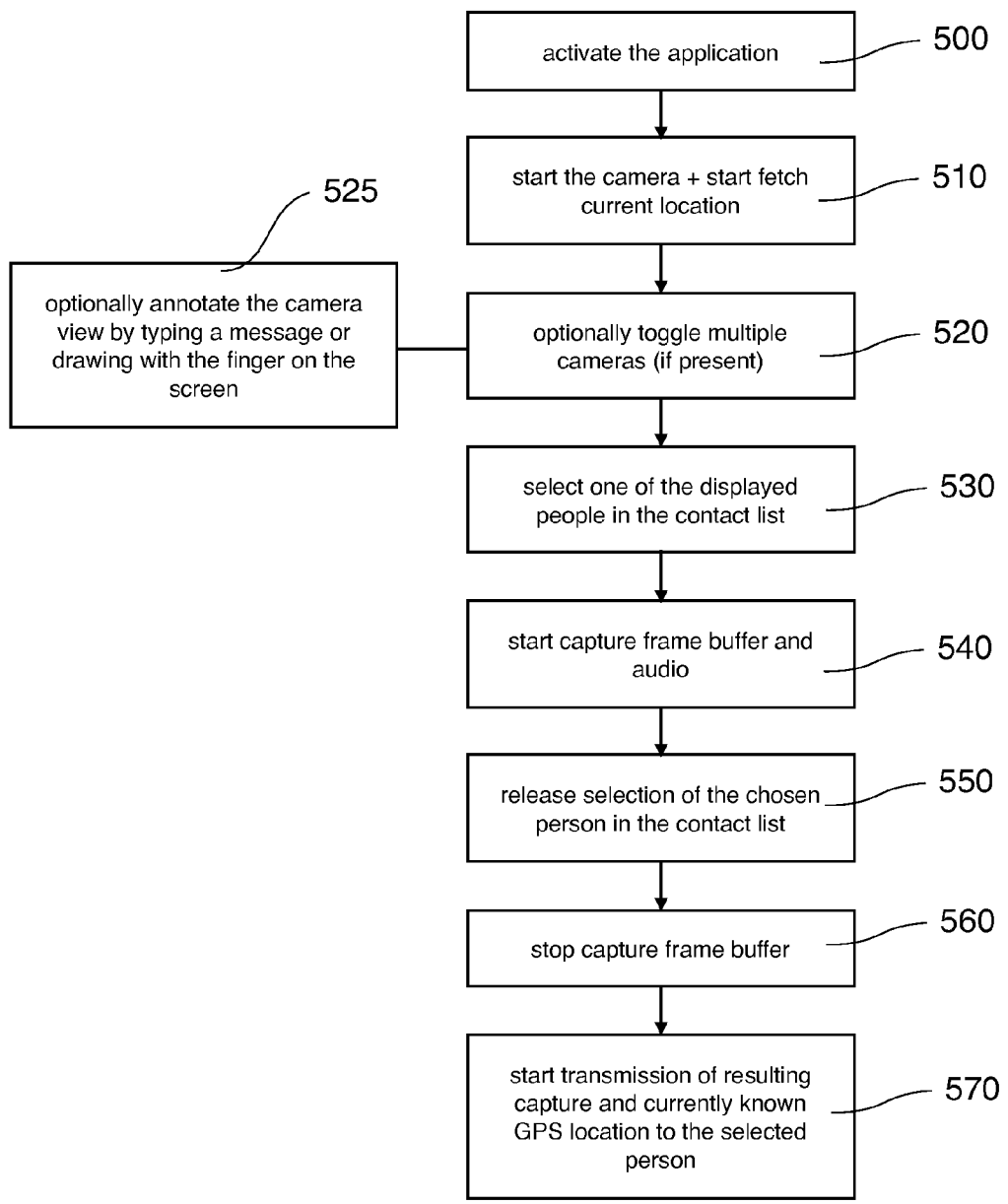

SINGLE ACTION PHOTO AND VIDEO MESSAGING

CROSS-REFERENCE TO RELATED APPLICATIONS

This application claims priority to U.S. Provisional Application No. 62/007,777, filed Jun. 4, 2014, which is incorporated by reference as though fully set forth herein.

TECHNICAL FIELD

The present invention relates generally to computer image and video, and more specifically to image and video communication between users.

BACKGROUND

In traditional electronic communication and messaging platforms, invoking the use of photos and videos requires multiple steps and user interactions. One widely used model includes the user picking a contact or conversation, creating the message, and then sending the message to the chosen contact. In another widely used model, the user creates a message in media (photo or video), then edits the message, and then selects the recipients from a list of contacts. Moreover, capturing the photo or video usually requires a confirmation message or notification to be sent to both the sender and the receiver. These multi-step procedures reduce speed and spontaneity for the sender.

There is a need for a messaging application that enables users to send a photo or video to a chosen contact with one direct and simple user interaction.

SUMMARY

One advantage achieved by the present invention is the automated completion of several steps in response to a single user action that would typically require several inputs from the user (that is, "one-touch" or "one-click" functionality). The application carries out the steps of 1) choosing a recipient 2) capturing the camera view in a photo or video with audio, and 3) sending the captured media to the chosen recipient, all with only one simple input action performed by the user (in some implementations, a single tap, touch, or swipe on a touchscreen).

In some embodiments, a user interface is provided that simultaneously displays on the screen both a list of one or more contacts and/or groups of contacts as well a live view that can be captured via photo or video. Selecting a contact or group of contacts that the user wants to transmit a photo or video message to and capturing the image or video can be performed in a single user input action (e.g., a single user "tap" or "touch") on the screen.

Particular embodiments of the present invention are directed to systems, methods, and non-transitory computer program products for providing electronic messaging, including, for example, photo and video messaging.

In one particular embodiment, a computer-implemented method includes simultaneously displaying both a live feed representing visual data captured by a video recording device and a plurality of contact icons, each contact icon associated with one or more destinations to which media data can be sent. A single action is received from a user selecting one of the plurality of the displayed contact icons. In response to the user's single action and not based on any subsequent input from the user, the following steps are carried out automatically: capturing visual data from the video recording device, and sending, to the one or more destinations associated with the selected contact icon, the captured visual data.

In further aspects of this particular embodiment, the captured visual data can be a still image. In still further aspects of this particular embodiment, the user's single action can be tapping the selected contact icon on a touch screen.

In other aspects of this particular embodiment, the captured visual data can be a video clip representing images taken over time. In still further aspects of this particular embodiment, the user's single action can be touching and holding the selected contact icon on a touch screen. The video clip can be taken over a window of time corresponding to the user's touching and holding the selected contact icon.

In still further aspects of this embodiment, the method includes the steps of receiving further input from the user during the window of time and sending additional data along with the captured visual data based on the further input from the user. The additional data may be one of image or text generated by the user sent for display superimposed on the captured visual data.

In some aspects of this embodiment, audio corresponding to the video clip is also sent to the selected one or more destinations along with the video clip.

In accordance with another embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another embodiment, the techniques may be realized as a system comprising a video recording device and one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

The accompanying drawings, which are incorporated herein and form part of the specifications, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 5 is a flow diagram illustrating steps of a process for one-touch image messaging in accordance with exemplary embodiments of the present invention.

DETAILED DESCRIPTION

Systems and methods for "one-touch" photo and video messaging are disclosed. In one particular embodiment, a screen on a device equipped with a camera displays a live view f and, simultaneously, a list of one or more of the user's contacts and/or groups of contacts. Tapping on one of the contacts or groups captures the view of the camera and transmits this view, i.e., in the form of, for example, a photo, to the selected contact or group. Instead of tapping for a photo, the user can also instead touch the contact or group for a period of time (i.e., a period of time that is longer than the time for a single tap, for instance, three seconds) to capture the live view and the audio, i.e., in the form of, for example, a video clip, and upon releasing the contact or group, the resulting video is transmitted to the selected contact or group. Selecting the contact or group, capturing the photo or video (the visual message), and sending it to the desired contact or group is all accomplished in one action by the user. Various additional icons and options are provided in different embodiments to allow for additional functions to be carried out in accordance with photo and video editing as described herein.

Figure 1:
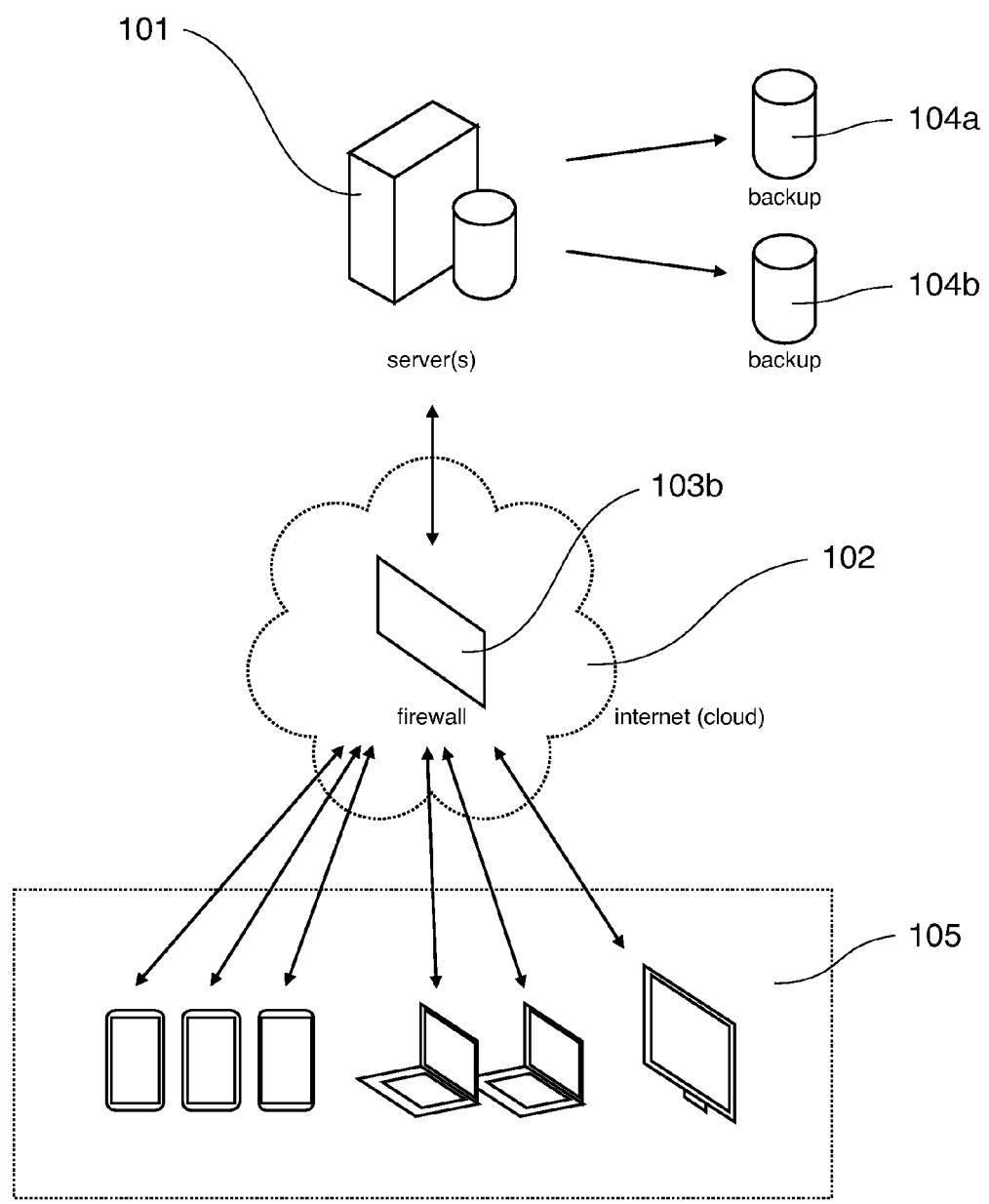
FIG. 1 an exemplary screen of the user interface upon entering in text or illustrates an exemplary architecture of a communication system in accordance with exemplary embodiments of the present invention.

Referring to FIG. 1, an exemplary architecture of a communication system in accordance with exemplary embodiments of the present invention is illustrated. System 100 includes at least one server 101 that is coupled with an electronic data network 102 (e.g., the internet).

The server can 101 be configured to communicate with one or more client user devices 105. The server 101 may communicate with one or more client user devices 105 through a firewall 103b. Non-limiting examples of client user devices 105 include a computer, a tablet, a television, a digital camera or camcorder, and a mobile device. The client user device 105 can be configured to receive a computer program product (e.g., application or app) and execute a program implementing features of the present invention, as explained in further detail below. The client user device 105 can be configured to access the computer program product via the electronic data network 102. In certain embodiments, a custom API can be installed on a client user device that allows a user to send and receive photo and video messages within one user interaction. The client user device 105 can be configured to communicate with one or more servers 101 via an electronic network 102. The one or more servers 101 may be coupled with the electronic data network via a TCP/IP connection via, for example, an Internet Service Provider (ISP).

The one or more servers 101 are configured to provide for access to the computer program product and the data associated with operation of the product. In one embodiment, the one or more servers 101 provide for access to and loading of the computer program product on to a client user device 105 and, in operation, handle the maintaining, accessing, routing, and processing of data (such as, for example, user information, photos, videos, messages, and other content) and the provision of other services in accordance with exemplary embodiments of the invention, as explained in further detail below. Accordingly, servers 101 can include a conventional hardware arrangement and be outfitted with software and/or firmware for performing web server functions, such as, for example, javascript/jquery, HTML5, CSS2/3, and facilities for SSL, MySQL, PHP, and SOAP, etc.

Servers 101 may be coupled with a data storage facility, including backup local or remote memory units 104a, 104b, and can include one or more databases and/or file systems for storing data, graphics, HTML documents, XML documents, etc.

Servers 101 can be configured to include an "admin" function, which enables an administrator to perform system related functions. The system related functions can include maintaining user records, performing upgrades, etc.

Figure 2:
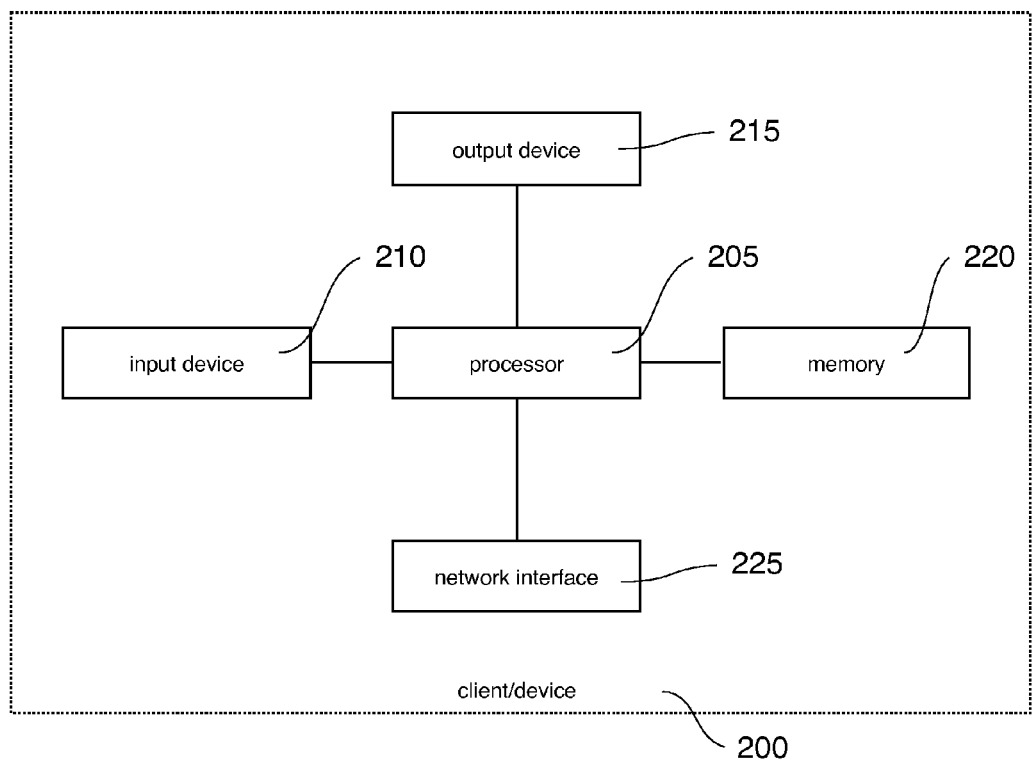
FIG. 2 is a block diagram of a client device in accordance with exemplary embodiments of the present invention.

Referring to FIG. 2, a block diagram of a device 200 in accordance with exemplary embodiments of the present invention is illustrated. The device 200 can be, for example, a client user device 105 including but not limited to a computer, a tablet, a television, a digital camera or camcorder, or a mobile device. As shown in FIG. 2, the device 200 may include a processor 205, which may include one or more microprocessors and/or one or more circuits, such as an application specific integrated circuit (ASIC), field-programmable gate arrays (FPGAs), etc.

The device 200 may include a network interface 225. The network interface 225 is configured to enable communication with a communication network, using a wired and/or wireless connection.

The device 200 may include memory 220, which may include one or more non-volatile storage devices and/or one or more volatile storage devices (e.g., random access memory (RAM)). In instances where the device 200 includes a microprocessor, computer readable program code may be stored in a computer readable medium, such as but not limited to magnetic media (e.g., a hard disk), optical media (e.g., a DVD), memory devices (e.g., random access memory), etc. In some embodiments, computer readable program code is configured such that when compiled and executed by a computing device, the code causes the device to perform some or all of the steps described below with respect to some implementations of the present disclosure.

The device 200 may include an input device 210. The input device is configured to receive input from either a user or a hardware or software component. Examples of an input device 210 include a keyboard, mouse, microphone, touch screen, etc. The device may also include an output device 215. Examples of output devices 215 include monitors, televisions, mobile device screens, tablet screens, speakers, etc. The output device 215 can be configured to display images or video or play audio to a user. One or more of the input and output devices can be combined into a single device.

Figure 3:
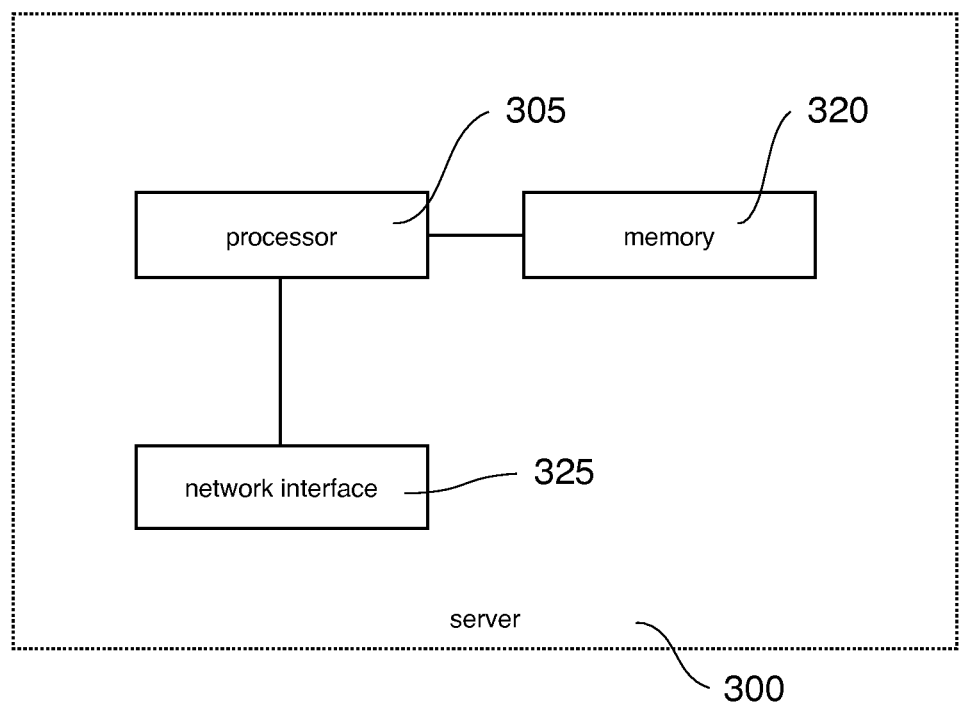
FIG. 3 is a block diagram of a server device in accordance with exemplary embodiments of the present invention.

Referring now to FIG. 3, a block diagram of a server 300 in accordance with exemplary embodiments of the present invention is illustrated. As shown in FIG. 3, the server 300 may include a network interface 315 for transmitting and receiving data, a processor 305 for controlling operation of the server device 300, and a memory 310 for storing computer readable instructions (i.e., software) and data. The network interface 315 and memory 310 are coupled to and communicate with the processor 305, which controls their operation and the flow of data between them.

Processor 305 may include one or more microprocessors and/or one or more circuits, such as an application specific integrated circuit (ASIC), field-programmable gate arrays (FPGAs), etc. Network interface 325 can be configured to enable communication with a communication network, using a wired and/or wireless connection. Memory 310 may include one or more non-volatile storage devices and/or one or more volatile storage devices (e.g., random access memory (RAM)). In instances where server system 300 includes a microprocessor, computer readable program code may be stored in a computer readable medium, such as, but not limited to magnetic media (e.g., a hard disk), optical media (e.g., a DVD), memory devices (e.g., random access memory), etc. In some embodiments, computer readable program code is configured such that when executed by a processor, the code causes the device to perform some or all of the steps described below with respect to some implementations of the present disclosure.

Server 300 can be configured to include an "admin" function, which enables an administrator to perform system related functions. The system related functions can include maintaining user records, performing upgrades, moderation of tasks, etc.

Figure 4A:
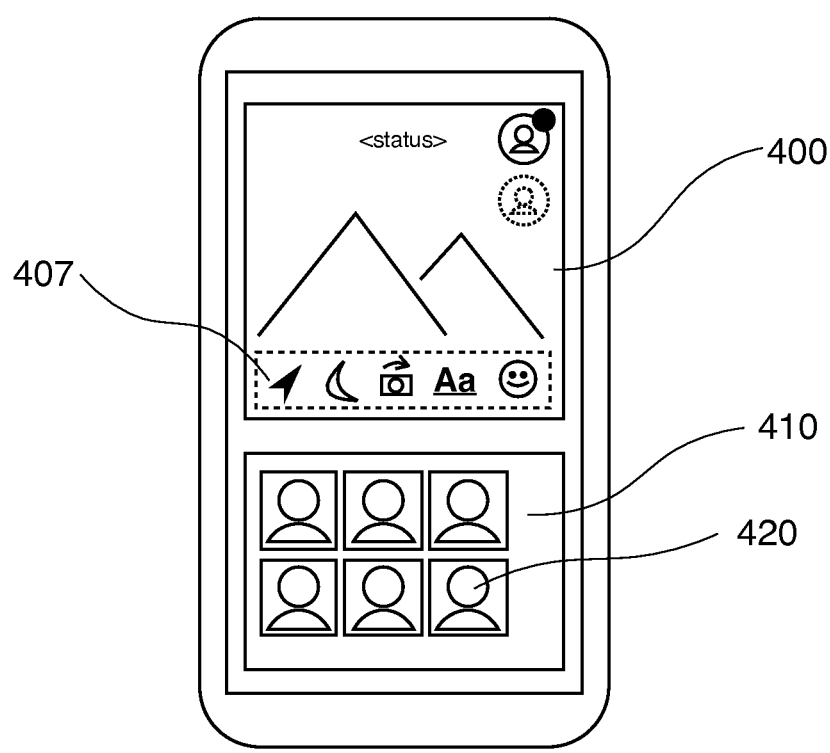
FIG. 4a illustrates an exemplary screen of a user interface upon entering an application in accordance with exemplary embodiments of the present invention.

Now referring to FIG. 4, an image of an exemplary screen of a user interface upon entering the application in accordance with exemplary embodiments of the present invention is provided. In an embodiment of the present invention, depicted in FIG. 4*a*, the UI includes of a live camera view 400 and a list of contacts 410. Touching (e.g., clicking, tapping, or long pressing) the live camera view 400 will change the camera in case the device has more than one camera. A GPS indicator is shown 407 to show the GPS information will be a part of the message. It can be turned off by touching the indicator.

Figure 4B:
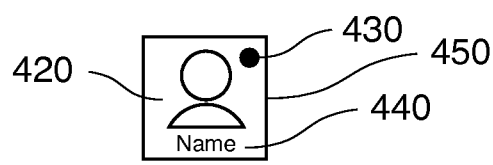
FIG. 4b illustrates an exemplary contact icon for the user interface in accordance with exemplary embodiments of the present invention.

In an embodiment of the present invention, depicted in FIG. 4*b*, a contact in the grid is represented by an image, a 'profile picture' 420. This image 420 has the name 440 of the contact in it in order to easily recognize who it is. The contact square also represents the status of the communication between the user and the contact represented in the area 430. It shows who sent the last message by marking the area with an alternate color or symbol 430. Furthermore, the contact square 450 is used to give feedback around the capture and transmission status of the message. When recording is in progress, the area 450 will change color or display a symbol 430 to indicate the capturing process. When the capturing is finished, the contact square 450 will display a symbol 430 or change color informing the user that the message is being transmitted. When transmission ends a failure or success is indicated with a symbol 430 or by changing color. The status of the transmission or the GPS location is additionally shown in the form of text 402 at the top center of the camera view. The status text is always temporal and just showing when there is something the user needs to be aware of "sending", "sending failed", "sent".

Figure 4C:
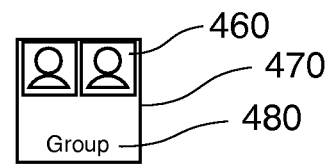
FIG. 4c illustrates an exemplary contact icon for the user interface in accordance with exemplary embodiments of the present invention.

In another embodiment, depicted in FIG. 4*c*, a contact square can also represent a group of contacts 470, represented by combining each group member's profile picture 460 in the area 470 and a group name 480. Alternatively, a user can select a custom profile photo for the group with the group name and a member count displayed.

By combining the contact list and the live camera view in one display, it is possible to capture the view and GPS location and select the recipient in response to one user interaction.

Now referring to FIG. 5, a flow diagram illustrating steps of a process for photo or video messaging in accordance with exemplary embodiments of the present invention is provided.

In an embodiment of the present invention, when the application is activated (500), it immediately starts the camera live preview and fetches the current GPS position of the device (510). For devices equipped with multiple cameras, the camera used can be toggled by tapping on the live camera view (520). When a contact is selected from the list by tapping/touching the area representing the contact (530), recording of the camera view starts (540). When the touch screen is released (550), the recording stops and the resulting media is captured in a file (560). The file will result in a still image if the selection is released immediately, and a video including audio if the release takes longer then a certain threshold. After, the currently known GPS position and resulting captured file(s) will be delivered to the selected contact (570). When a group is selected, the known GPS location and resulting captured file will be delivered to each of the individual group's members.

In another embodiment (step 525), text can be entered by tapping the viewfinder control area's "text" icon 405 of the camera preview 400, as illustrated in FIG. 4. When an annotation is entered, the result is captured in a separate layer to be transmitted with the message. The text entered is cleared from the camera view after release.

In yet another embodiment (step 525), a drawing, such as a line drawing, can be drawn on the screen with, for example, the user's finger, by touching a portion of the camera preview 400. When an annotation is entered, the result is captured in a separate layer to be transmitted with the message. The drawing entered is cleared form the camera view after release.

Figure 6A:
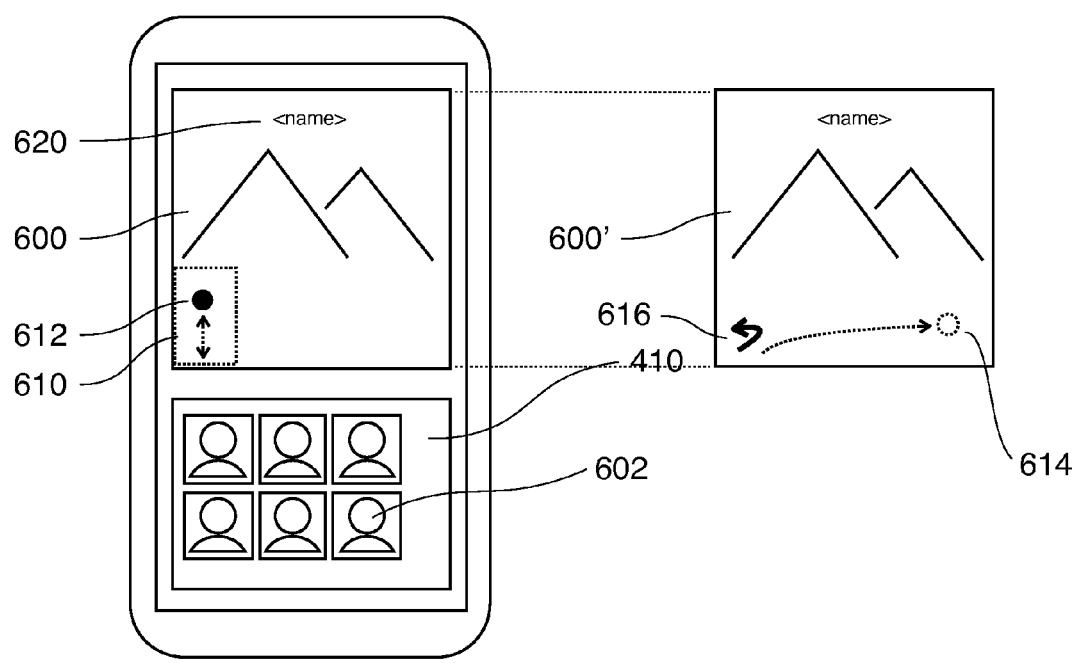
FIG. 6a illustrates exemplary screens of a user interface while sending a message in accordance with exemplary embodiments of the present invention.

Now referring to FIG. 6*a*, images of exemplary screens of the user interfaces while sending a message in accordance with exemplary embodiments of the present invention are provided.

Figure 6B:
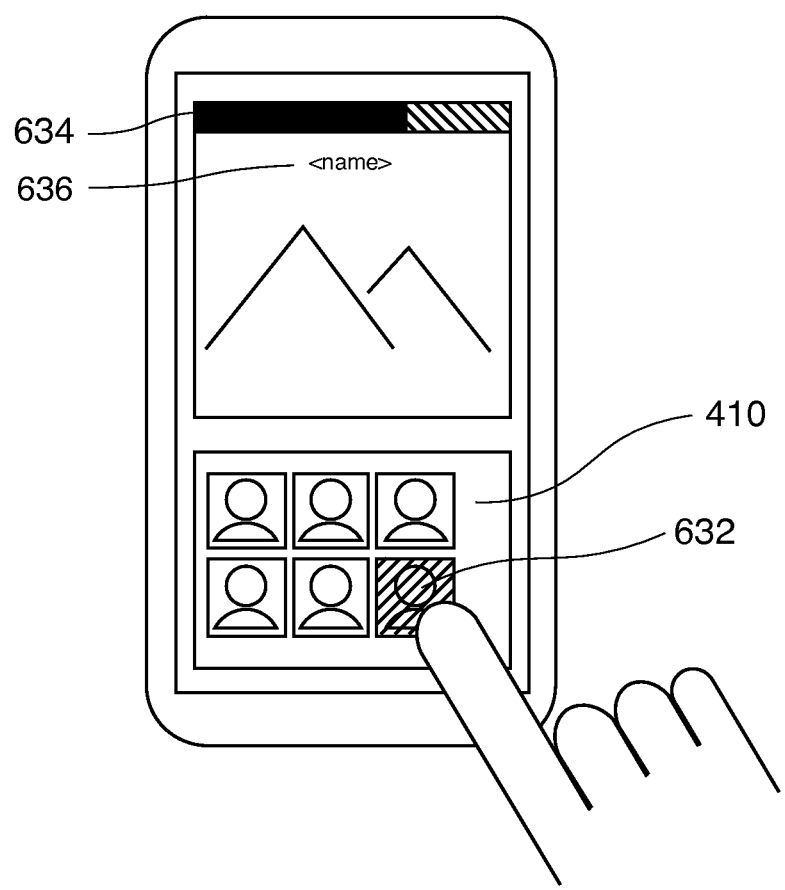
FIG. 6b illustrates an exemplary screen of the user interface while sending a message in accordance with exemplary embodiments of the present invention.

In an embodiment of the present invention, sending a photo, depicted in FIG. 6*a*, works by selecting one of the contact squares 602 represented as described in FIG. 4. Tapping or clicking the contact square will immediately initiate a photo message of the captured image as represented in the viewfinder 600 at that moment. When transmitting a photo message, depicted as the alternate screen 600', a bouncing ball 612 is shown in a sending status window 610 and the name of the recipient in text is briefly shown 620 in the viewfinder section 600 of the display screen. Holding the contact down will record a video, depicted in FIG. 6*b*, as described in FIGS. 4 and 5, and the recording status is indicated on the contact 632 and by a progress bar 634 indicating the recording time passed and left. As the recording progresses, the name of the recipient 636 also appears in the viewfinder 600 area of the device display. As with the transmission of the photo message, a bouncing ball is shown to represent the video message's sending status 612. In both the photo and video message scenarios, the ball indicator bounces 612 to represent that the message is queued but unsent. As the message is transmitted via the network this is communicated to the user via the ball rapidly bouncing across the screen 614. At any point while the message is queuing, as indicated by the bouncing ball 612, the user can undo their last message by hitting the undo icon 616 on the viewfinder 600 area of the display.

Now referring to FIGS. 7*a*, 7*b*, 8, 9*a*, and 9*b*, images of exemplary screens of a grid interface for browsing, organizing and searching contacts in accordance with exemplary embodiments of the present invention are provided.

Figure 7A:
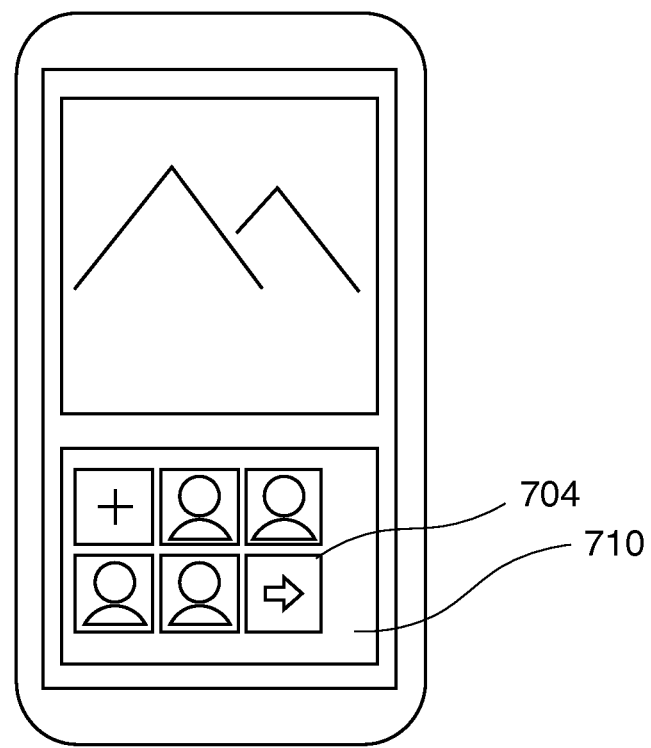
FIG. 7a illustrates an exemplary screen of the user interface while finding a particular contact in accordance with exemplary embodiments of the present invention.
Figure 7B:
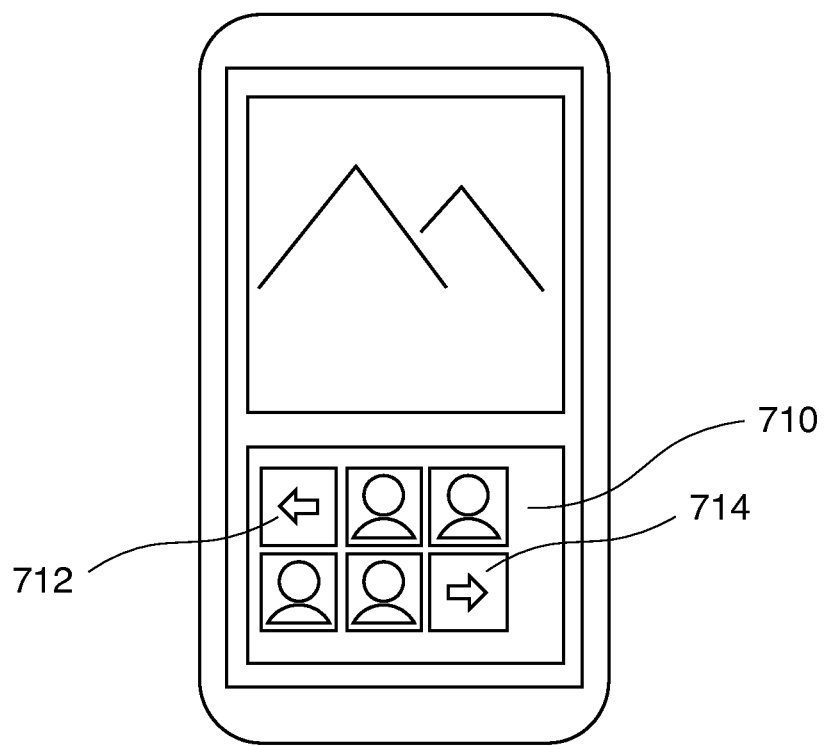
FIG. 7b illustrates an exemplary screen of the user interface while finding a particular contact in accordance with exemplary embodiments of the present invention.

In an embodiment of the present invention, the contact grid 710, as depicted in FIG. 7*a*, organizes the contact squares in a list of contacts 710 ordered chronologically by last received message, with the most recent contact displayed first. The displayed order is from top left to bottom right, horizontally. Depending on the device's proportions and size, the size of the squares in the grid 710 may vary. In case more contacts are present then can be displayed in the grid 710, tapping an arrow navigation cue in the bottom right square 704 will navigate the user to the next available batch of contacts. Moving to the subsequent contact grid page will present another arrow navigation cue in the upper left square 712. If further pages are available, another navigation arrow cue will be presented in the bottom right square 714.

Figure 8:
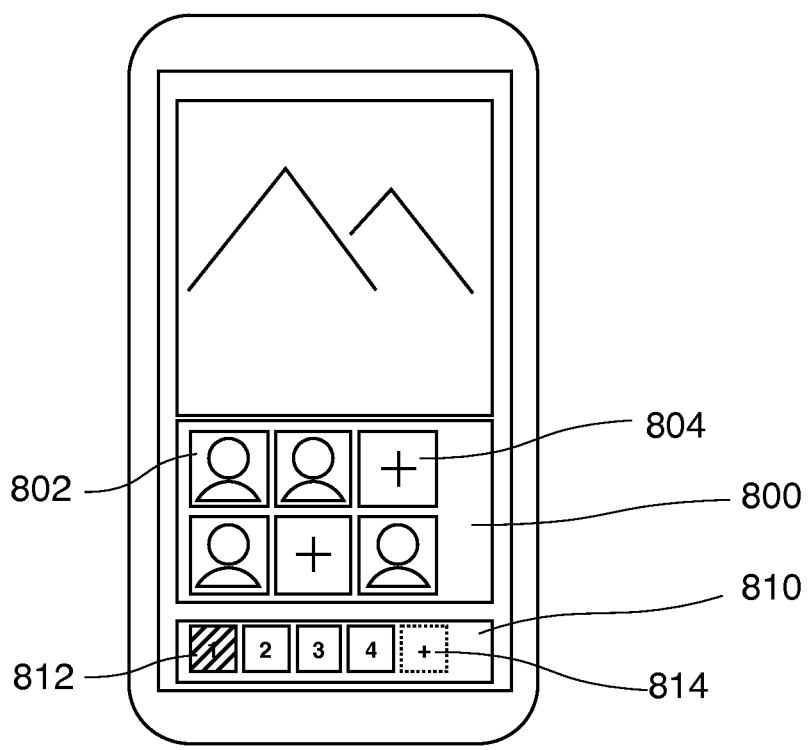
FIG. 8 illustrates an exemplary screen of the user interface while navigating the user's contacts in accordance with exemplary embodiments of the present invention.
Figure 9A:
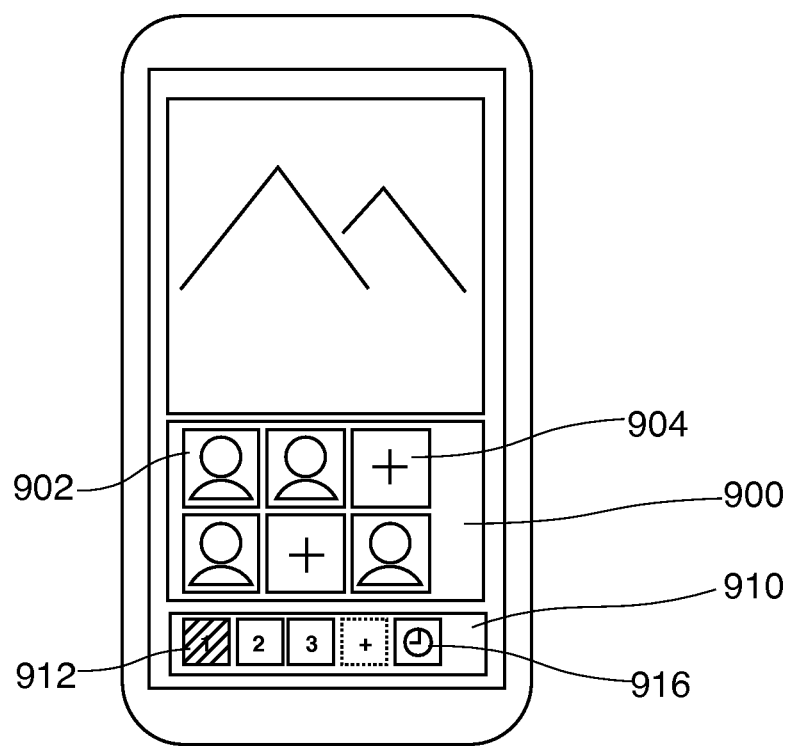
FIG. 9a illustrates an exemplary screen of the user interface while navigating the user's contacts in accordance with exemplary embodiments of the present invention.
Figure 9B:
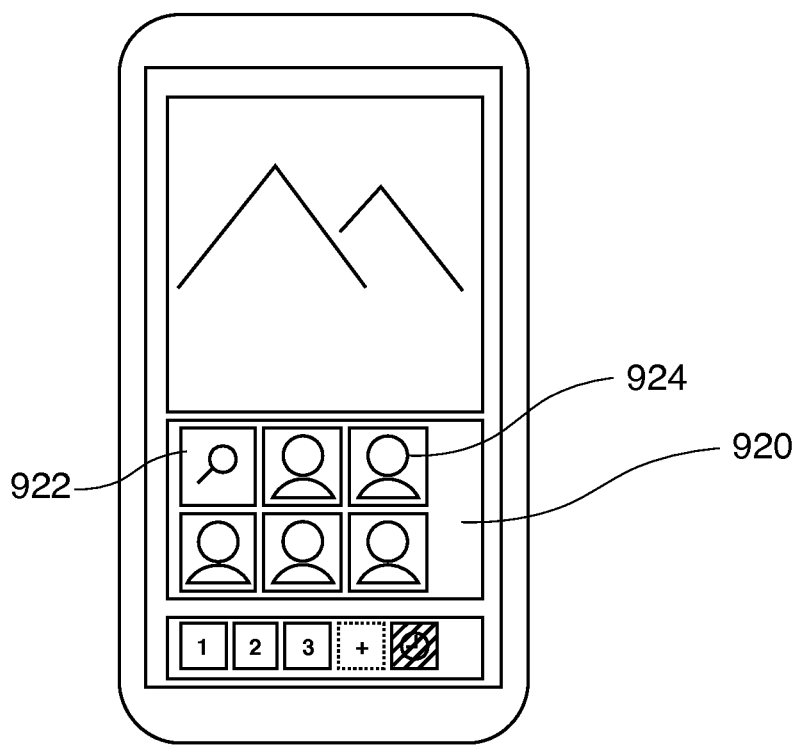
FIG. 9b illustrates an exemplary screen of the user interface while navigating the user's contacts in accordance with exemplary embodiments of the present invention.

In yet another embodiment, the contact grid, as depicted in FIG. 8, organizes the contact squares in a list of contacts in the grid page 800 in a fixed order as defined by the user. Tapping or clicking the an empty contact square 804 in the grid will initiate a sub-menu for inviting a contact not yet on the messaging network or adding a contact who already is on the messaging network. After a contact has been added to the grid page 800 the contact is represented in a contact square 802. Depending on the device's proportions and size, the size of the squares in the grid 800 may vary. In this embodiment, navigation is handled in a page navigation area 810 by a set of numbered square buttons that organizes grid pages 800 in a sequential order 810. The page currently being viewed is highlighted or shaded to display on the screen that it is the active grid page 812. In the page navigation area 810 additional grid pages 800 can be added by tapping or clicking a final square 814 with a "+" symbol.

In yet another embodiment, the contact grid, as depicted in FIG. 9, organizes the contact squares in a list of contacts in the grid page 900 in a fixed order as defined by the user. Tapping or clicking an empty contact square 904, indicated by having a "+" symbol instead of a photo of a contact, in the grid will initiate a sub-menu for inviting a contact not yet on the messaging network or adding a contact who already is on the messaging network. After a contact has been added to the grid page 900 the contact is represented in a contact square 902. In this embodiment, navigation is handled in a page navigation area 910 by a set of numbered square buttons that organizes grid pages 900 in a sequential order 910. The page currently being viewed is highlighted or shaded to display on the screen that it is the active grid page 912. In the page navigation area 910 additional grid pages 900 can be added by tapping or clicking a second to last square with a "+" symbol within 914. Depending on the device's proportions and size, the size of the squares in the grid 920 may vary.

Tapping the final square containing a "timer" symbol 916 in the page navigation area 910 will navigate to another grid page 920 where the contact squares 922 are ordered chronologically by last received message, with the most recent contact first. The displayed order is from top left to bottom right, horizontally. Clicking on the upper left square containing a "magnifying glass" icon 922 will open up a quick search window for browsing, searching and bringing a given contact to the top left position of the grid page 920.

Figure 10:
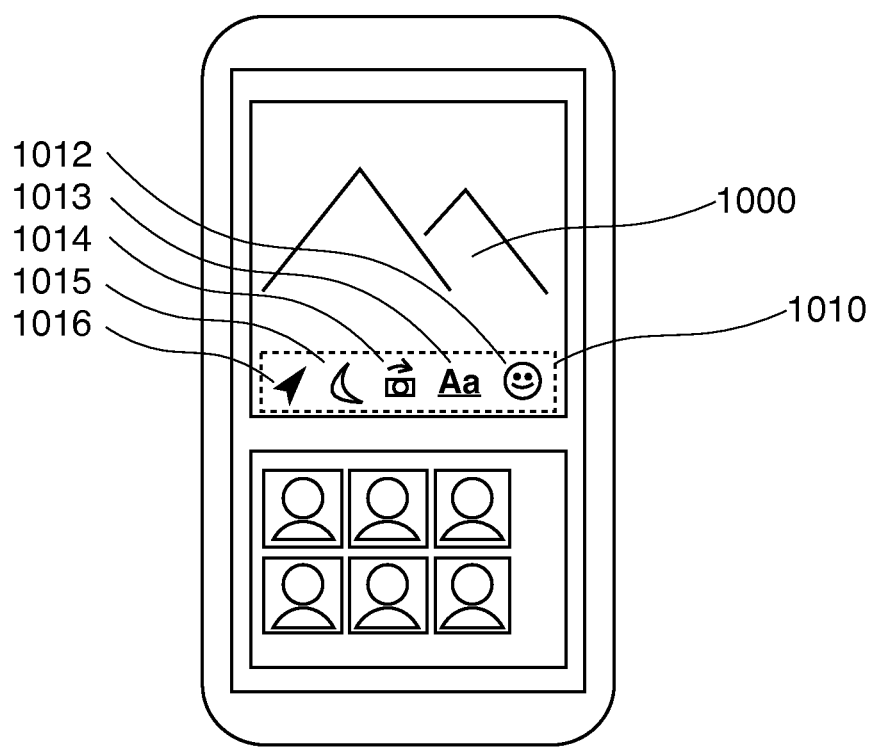
FIG. 10 illustrates an exemplary screen of the user interface including an assortment of function icons in accordance with exemplary embodiments of the present invention.

Now referring to FIG. 10, images of exemplary screens of the main user interface for manipulating the frames captured by the device cameras and displayed on the viewfinder on the display screen in accordance with exemplary embodiments of the present invention are provided.

In an embodiment of the present invention, the viewfinder controls 1010, as depicted in FIG. 10., organize a series of user controls in a uniform series at the bottom of the viewfinder 1000. Before selecting the contact, capturing and sending as described in FIGS. 4 and 5, the camera can be selected and a set of manipulations and overlays on the viewfinder can be added, depicted in FIG. 10. Each control is represented on the viewfinder display 1000 in the control section 1010 as a unique icon. A GPS indicator is shown 1016 to show the GPS information will be a part of the message. It can be turned off by touching the indicator. A filter control is shown 1015 to enable the user to scroll or click through multiple photographic filters manipulating the frames captured by the device's active camera as it is displayed and rendered on the viewfinder 1000 screen. A camera control is shown 1014 to enable the user to change the device's active camera. Likewise, tapping any part of the live camera view in the viewfinder 1000 can change the device's camera. Tapping the text icon 1013 in the controls area 1010 activates text input, further depicted in FIG. 12, and brings up the keyboard. Typing text can behave as described in FIG. 13. Tapping the "emoji" icons control 1012 in the controls area 1010 activates icon input in the same manner as text input, depicted in FIG. 12, and brings up an alternate keyboard on the device display. Typing "emoji" icons can behave the same as text as described in FIG. 13.

Figure 11:
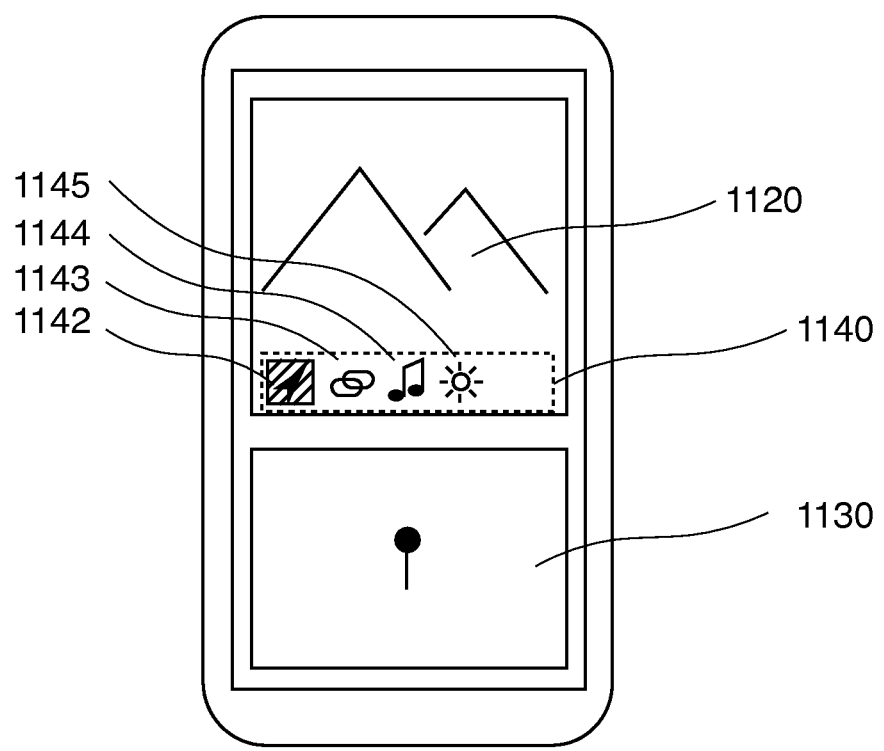
FIG. 11 illustrates an exemplary screen of the user interface detailing user controls in the primary viewfinder window on the device screen in accordance with exemplary embodiments of the present invention.

Now referring to FIG. 11, images of exemplary screens of the main user interface for adding embedded media in the primary photo or video message in accordance with exemplary embodiments of the present invention are provided.

In an embodiment of the present invention, the embed controls 1140, as depicted in FIG. 11, organize a series of controls in a uniform series at the bottom of the viewfinder 1120 for embedding or attaching additional information to the primary photo or video message captured by the device and transmitted to the recipient. Each control is represented on the viewfinder display 1120 in the control section 1140 as a unique icon. Holding down the GPS indicator icon 1142 in the embed controls area 1140 will bring up a location preview 1130 at the bottom of the display so long as the icon is held down. Once the icon is released this preview will vanish. Tapping the web-link icon 1143 will display on the screen an entry field for the user to copy and paste a weblink to a piece of content on the internet that can be attached to their primary photo or video message as an added piece of information for the recipient to view. Tapping the music icon 1144 will embed in the photo or video message information about the music currently being played on the device from local storage or streaming at the time the message was captured and transmitted. Tapping the weather icon 1145 will embed in the photo or video message information about the weather based on the time and location the message was captured.

Figure 12:
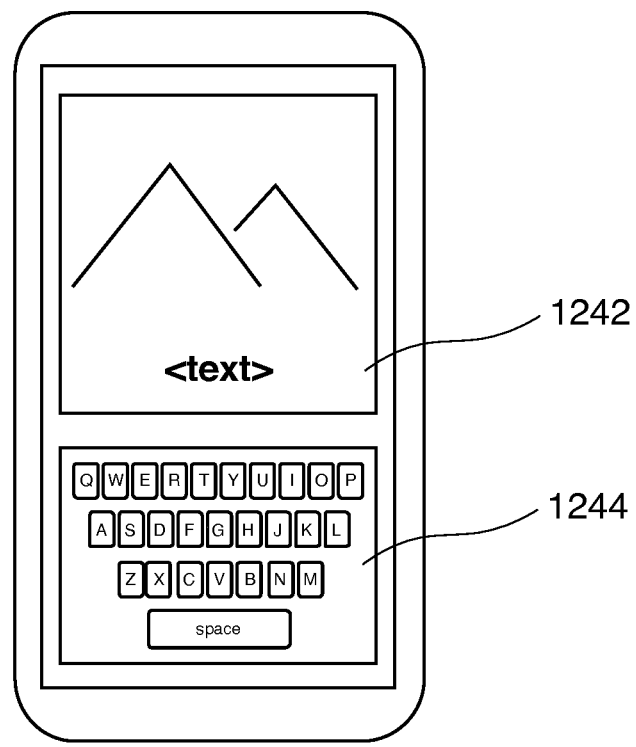
FIG. 12 illustrates icons for overlaying into the primary camera viewfinder on the screen of the device in accordance with exemplary embodiments of the present invention.

Now referring to FIG. 12, an image of an exemplary screen of the user interface for entering overlaid text in the primary photo or video message in accordance with exemplary embodiments of the present invention is provided.

In an embodiment of the present invention, text input interface as depicted in FIG. 12, works by tapping the text input icon 1013 (as shown in FIG. 10) to activate text input and brings up a keyboard 1244. Typing text is displayed on the bottom of the viewfinder 1242 behaving as described in FIG. 13.

Figure 13:
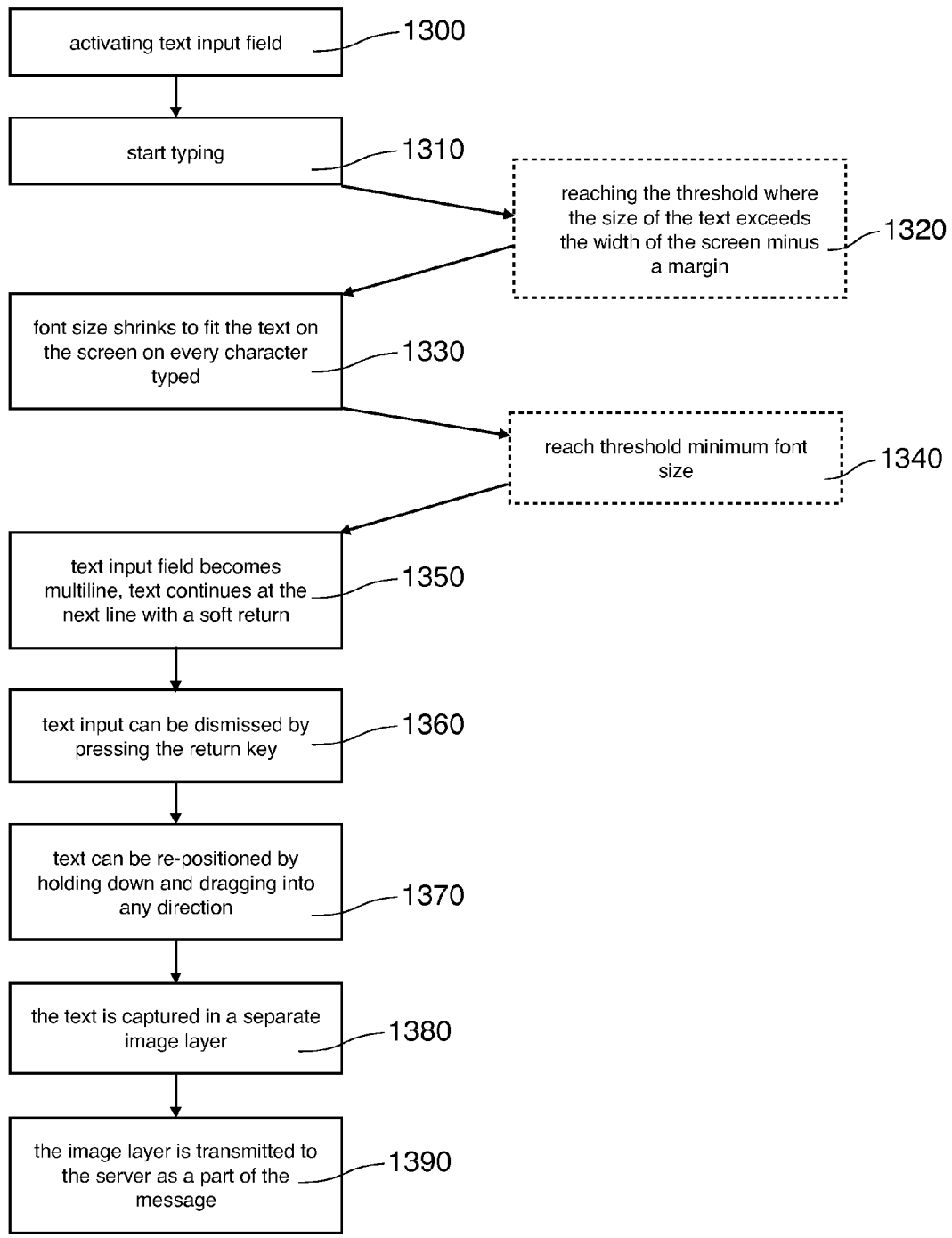
FIG. 13 is a flow diagram illustrating a process for text input in video messaging in accordance with exemplary embodiments of the present invention.

Now referring to FIG. 13, a flow diagram illustrating how text input works before sending the media in accordance with exemplary embodiments of the present invention is provided.

In an embodiment of the present invention, when a user taps the text input icon (1013 in FIG. 10), the user activates the text input field (1300). When the user starts typing (1310), the maximum font-size is used by default. When the size of the text exceeds the width of the screen (1320), the font size will shrink accordingly on every key stroke to fit within the screen (1330). When the minimum font size is reached (1340), the text field soft-wraps so the user can continue typing (1350). The text field can be dismissed by pressing the return key (1360); it can be manually repositioned anywhere on the camera view by holding the field down and dragging it in any direction (1370). The text input is captured as a separate image layer from the captured photo or video data in an image with a transparent background (1380) and is sent as a part of the message (1390).

Figure 14:
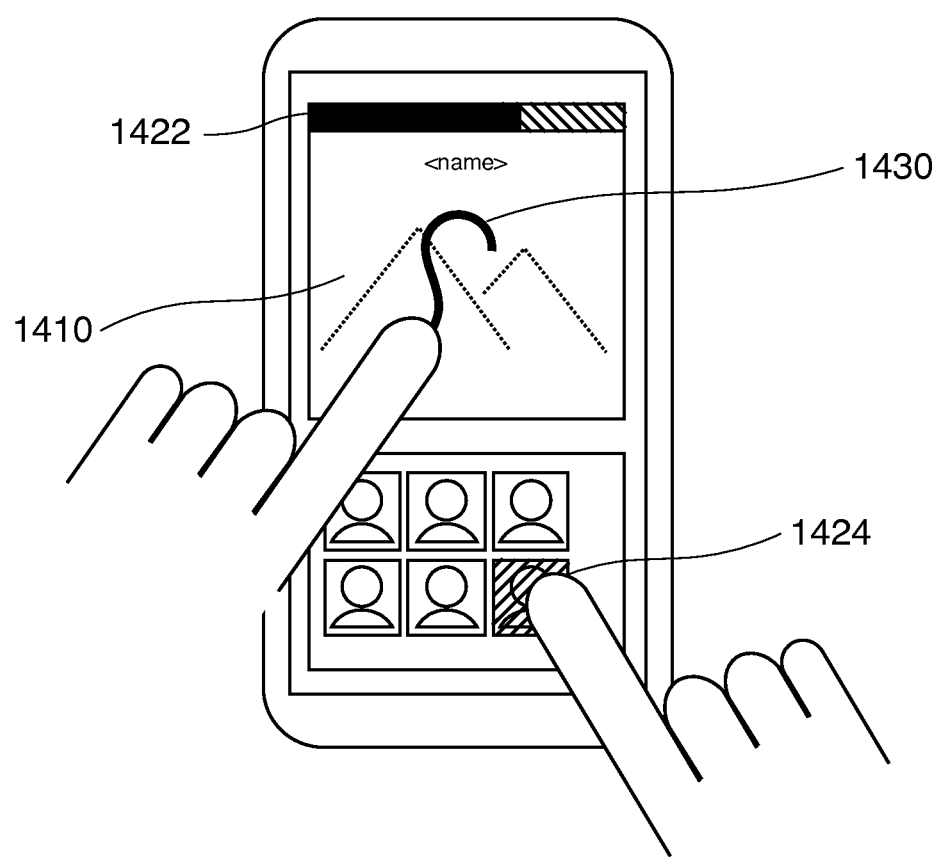
FIG. 14 illustrates an exemplary screen of the user interface for drawing over the image to be captured in accordance with exemplary embodiments of the present invention.

Now referring to FIG. 14, an image of an exemplary screen of the user interface for drawing images on the viewfinder screen for overlay on top of a frame of video in accordance with exemplary embodiments of the present invention is provided.

In an embodiment of the present invention, when a user is capturing a video by holding a touch on a contact icon 1424, the user can also activate the ability to draw on the touchscreen viewfinder display, typically with a free finger as a stylus. At the moment the user begins drawing on the screen, the live video capture immediately pauses as indicated by the recording status indicator pausing 1422 and the drawing 1430 manifests on a single frozen frame 1410.

Figure 15:
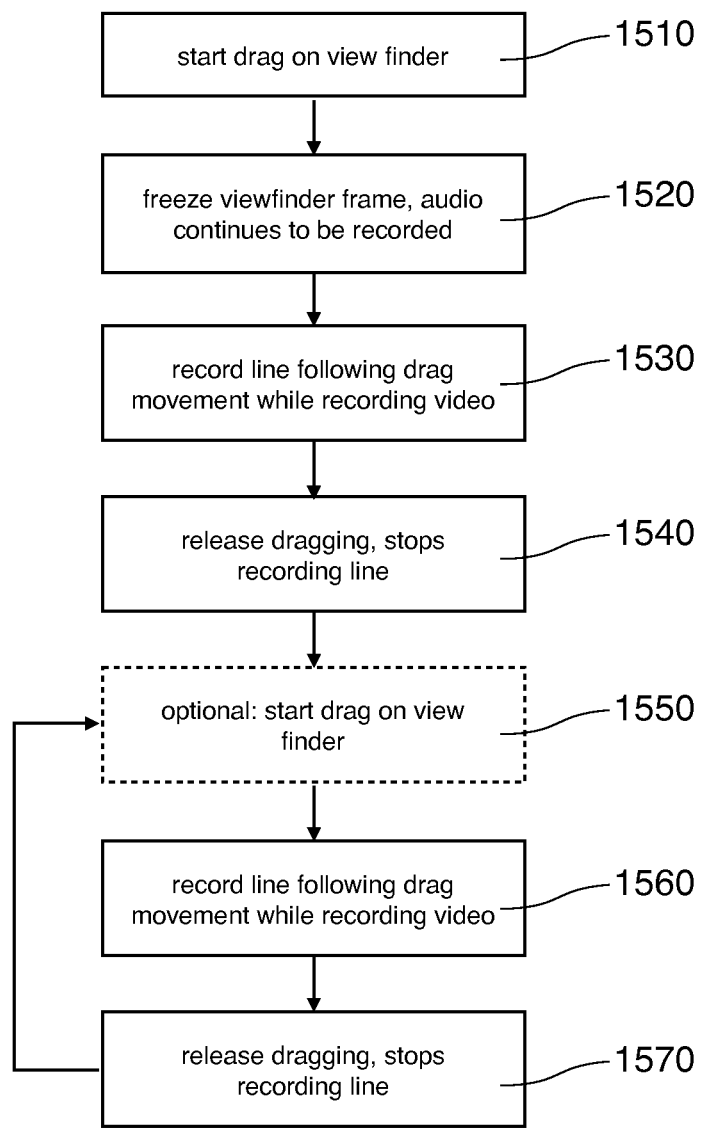
FIG. 15 is a flow diagram illustrating a process for drawing over a video message.

Now referring to FIG. 15, a flow diagram illustrating how drawing while recording video works in accordance with exemplary embodiments of the present invention is provided.

In an embodiment of the present invention, when a user drags their finger or a stylus on the viewfinder portion of the touchscreen (1510), the capture of the frame buffer by the device camera stops and the viewfinder frame on the display freezes while audio continues to be recorded (1520). As the finger maintains contact with the touchscreen display surface and continues to drag along the screen a trace line following the drag movement of the finger or stylus is recorded and displayed on the view finder as an overlay video tracking the drawing as it is being created (1530). When the finger or stylus releases its contact with the touchscreen display and releases dragging the recording of the trace path on the display, the animated video capture of the drawing trace line on the screen stops (1540). So long as the contact square is held down to capture video, this process of starting to drag the finger or stylus on the touchscreen display of the viewfinder (1550), recording the line trace line of the drag movement as a video of the drawing on the frozen viewfinder frame (1560), and stopping this recording when the finger or stylus releases contact with the screen can be repeated several times (1570, return to 1550). Once the finger holding the contact square of the chosen recipient releases from the screen, the capture of the drawing trace and frame buffer stops and the transmission of the resulting capture and currently known GPS location to the selected person starts.

Figure 16:
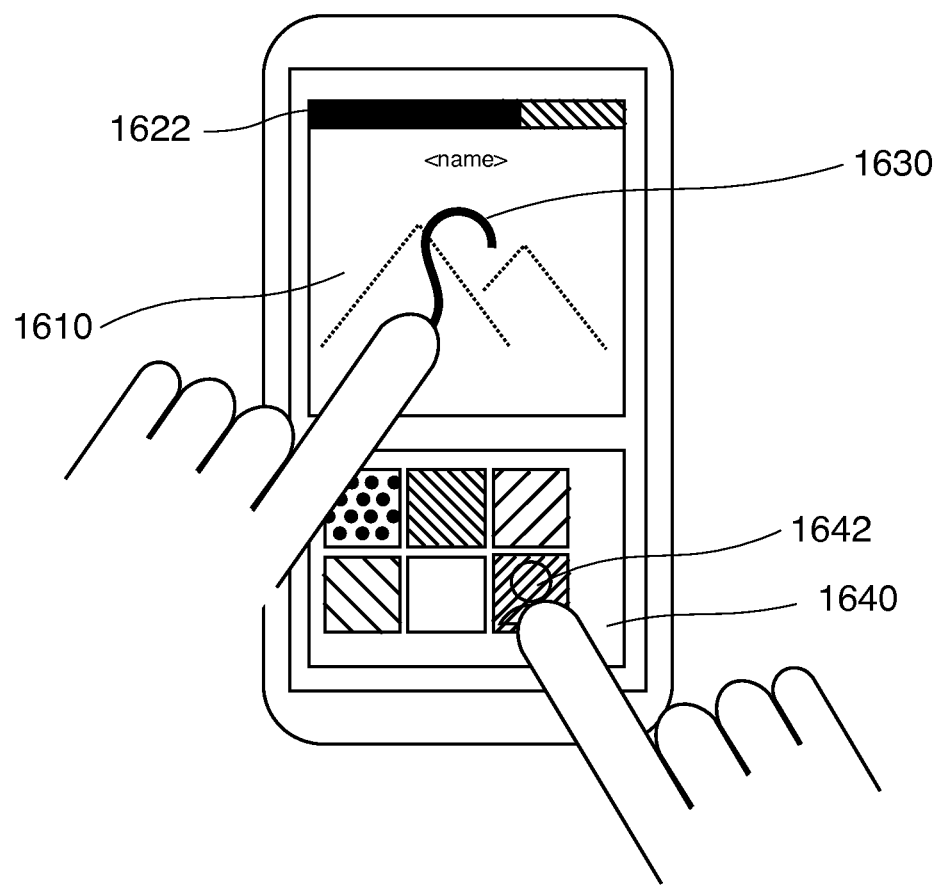
FIG. 16 illustrates an exemplary screen of the main user interface for drawing in color over the image to be captured in accordance exemplary embodiments of the present invention.

Now referring to FIG. 16, images of an exemplary screen of the main user interface for drawing images on the viewfinder screen for overlay on top of a frame of video in accordance with yet another exemplary embodiment of the present invention are provided.

In yet another embodiment of the present invention, when a user is capturing a video by holding a touch on a contact icon 1642, the user can also activate the ability to draw on the touchscreen viewfinder display, typically with a free finger as a stylus. At the moment the user begins drawing on the screen, the live video capture immediately pauses as indicated by the recording status indicator pausing 1622 and the drawing 1630 manifests on a single frozen frame 1610. A color palette 1640 appears in the contact square grid, replacing all of the contacts that are not the video recipient's contact square 1642. Each palette color in these contact grid squares is based on an active hue detected by the device's CMOS camera sensor. Tapping a color grid in this palette 1640 with one's free finger or stylus will select that color hue as the active color for the active drawing on the screen. Typically for ergonomic reasons, this is done with the opposing hand's fingers or thumb.

Figure 17:
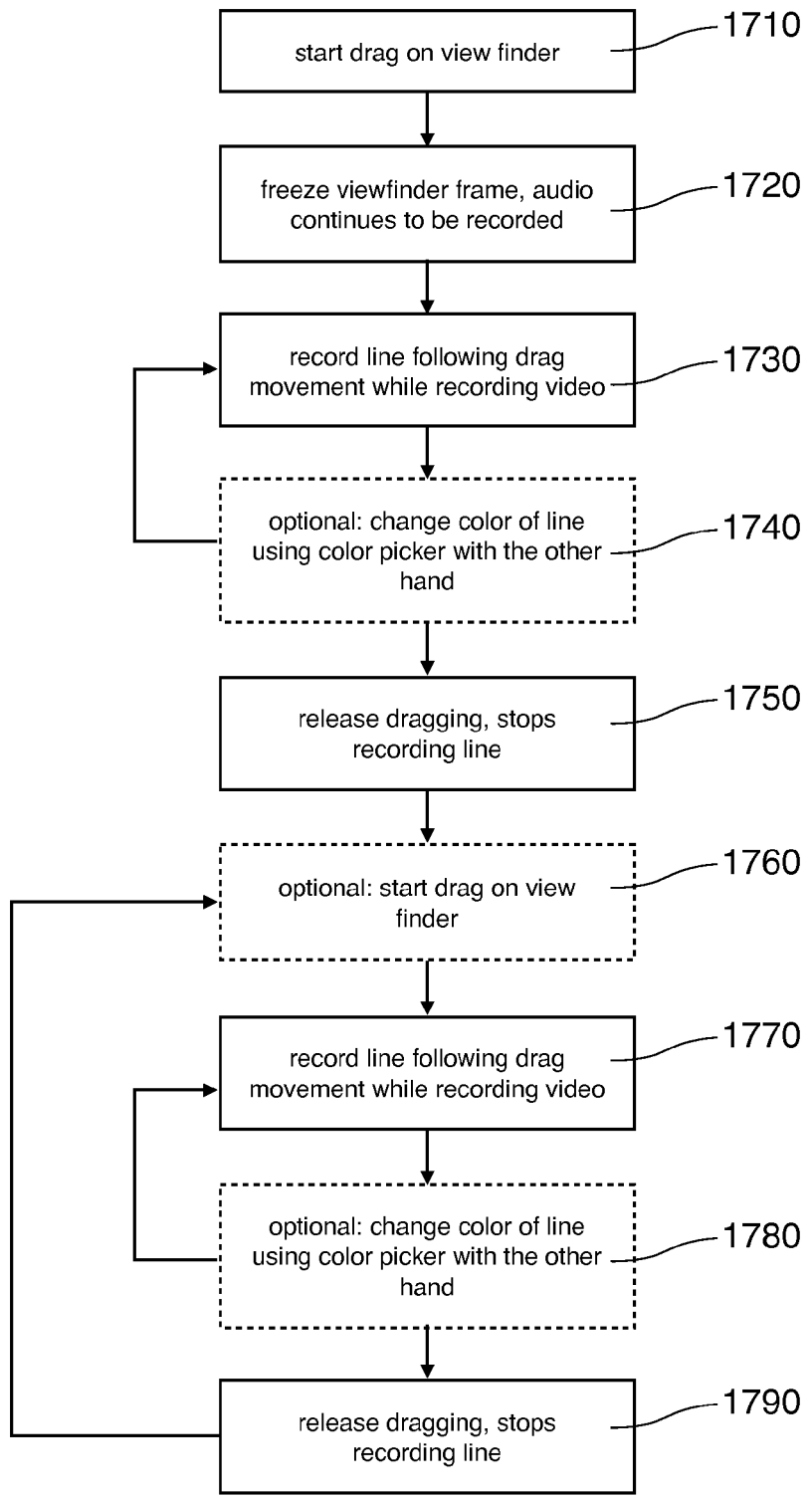
FIG. 17 is a flow diagram illustrating a process for color drawing over a video message in accordance with exemplary embodiments of the present invention.

Now referring to FIG. 17, a flow diagram illustrating how drawing while recording video works in tandem with the color picker palette in accordance with exemplary embodiments of the present invention is provided.

In yet another embodiment of the present invention, when a user drags their finger or a stylus on the viewfinder portion of the touchscreen (1710), the capture of the frame buffer by the device camera stops and the viewfinder frame on the display freezes while audio continues to be recorded (1720). As the finger maintains contact with the touchscreen display surface and continues to drag along the screen, a trace line following the drag movement of the finger or stylus is recorded and displayed on the view finder as an overlay video tracking the drawing as it is being created (1730). At any point so long as the contact square of the recipient is being held down to maintain the video capture process, the color of the trace drawing can be changed using the color palette with other fingers or stylus. Typically for ergonomic reasons, this is done with the opposing hand's fingers or thumb. When the finger or stylus releases its contact with the touchscreen display and releases dragging the recording of the trace path on the display and the animated video capture of the drawing trace line on the screen stops (1750). So long as the contact square is held down to capture video this process of starting to drag the finger or stylus on the touchscreen display of the viewfinder (1760), recording the line trace line of the drag movement as a video of the drawing on the frozen viewfinder frame (1770), selecting another color using the color picker palette in the contact grid with another finger or stylus (1780), and stopping this recording when the finger or stylus releases contact with the screen can be repeated several times (1790, return to 1760). Once the finger holding the contact square of the chosen recipient releases from the screen, the capture of the drawing trace and frame buffer stops, and the transmission of the resulting capture and currently known GPS location to the selected contact starts.

Figure 18:
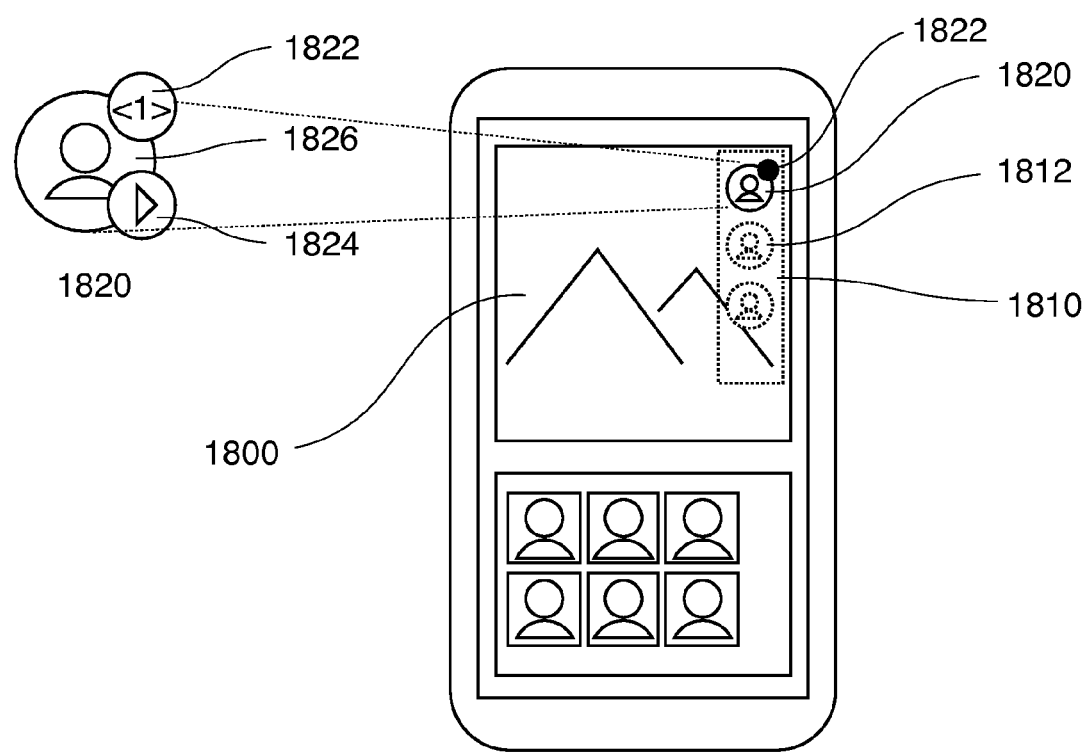
FIG. 18 illustrates an exemplary screen of the user interface detailing multiple inboxes in accordance with exemplary embodiments of the present invention.

Now referring to FIG. 18, an image of an exemplary screen of the user interface for viewing received message notifications queued for viewing in an inbox organization on the viewfinder screen in accordance with exemplary embodiments of the present invention is provided.

In an embodiment of the present invention, when the servers (101 of FIG. 1) detect a message has been sent to the end-user, a notification badge is presented on the main user interface 1822. These badges can be grouped into multiple inboxes in the same vertical area 1810. These groupings are pre-defined and can vary for example from being 1-to-1 message inboxes 1820 of personal messages to group message inboxes 1812 of messages sent on group channels within the messaging network. Each badge 1820 has a consistent structure that includes the sender badge count 1822 in the upper right corner representing the number of unseen messages queued up for viewing from a specific sender represented by the sender avatar 1826. Should one of the messages in this set of messages from a specific sender be a video then a video indicator symbol appears in the lower right corner 1824.

Figure 19:
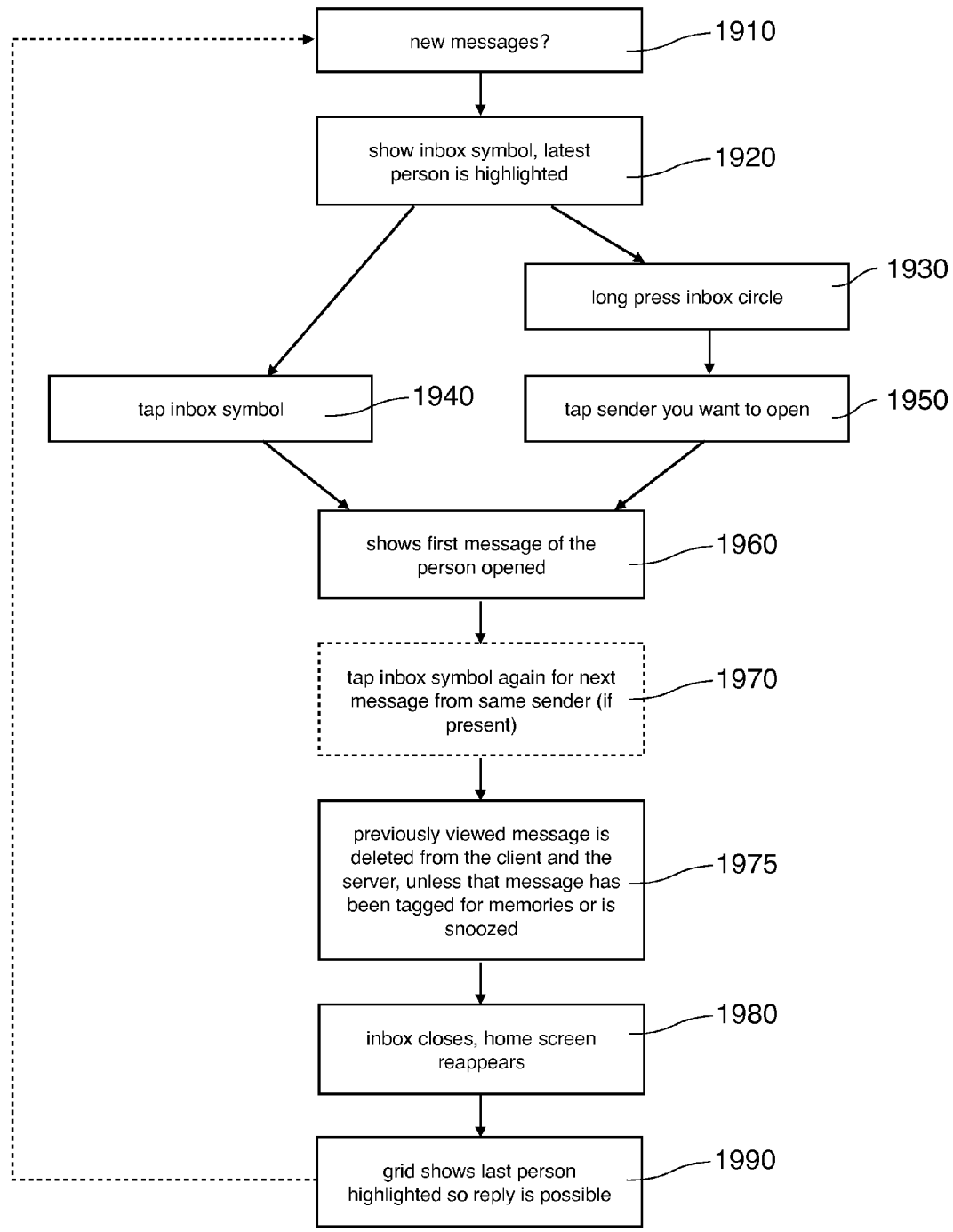
FIG. 19 is a flow diagram illustrating a process for accessing incoming messages in accordance with exemplary embodiments of the present invention.

Now referring to FIG. 19, a flow diagram illustrating how to open messages in the inbox in accordance with exemplary embodiments of the present invention is provided.

In an embodiment of the present invention, when a new message for the user is detected on the servers (1910), an inbox symbol appears on the main user interface with the latest sender highlighted in the inbox badge with the associated information on the number of messages received from that sender and if a video is part of this set (1920). Tapping the inbox badge symbol (1940) will open the first message from the latest sender 1960. A long press of the inbox circle badge (1930) will open up a selection interface where the user can browse the various sender message sets they have received and tap the sender whose messages they want to open 1950 showing the first message from the selected sender 1960. Tapping the inbox badge symbol again will present the next message from the same sender, if a message is present 1970. When all of the messages from the sender have been viewed then message viewing screen closes and the main user interface of the home screen reappears 1980. As the home screen reappears on the display screen, the contact square of the sender updates with an indicator displaying that they have sent the user a message.

Figure 20:
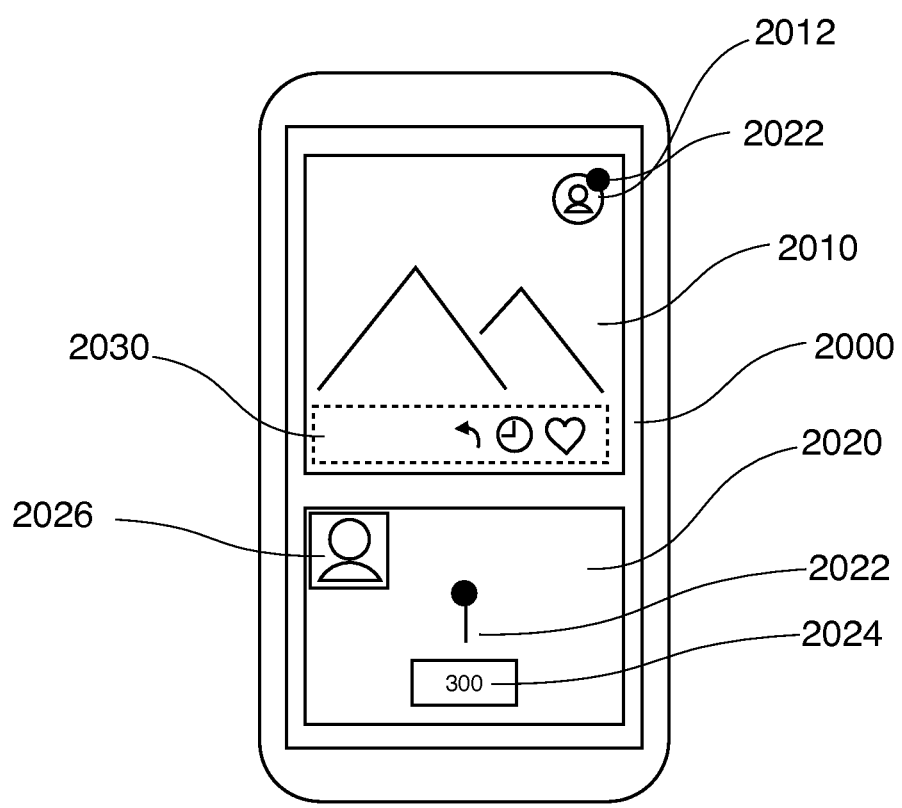
FIG. 20 illustrates an exemplary screen of the main user interface upon displaying a message in accordance with exemplary embodiments of the present invention.

Now referring to FIG. 20, an image of an exemplary screen of the user interface upon displaying a message in accordance with exemplary embodiments of the present invention is provided.

In an embodiment of the present invention, all of the incoming messages are represented by a badge 2012 with the number of messages waiting for the user from the specific sender. Tapping on this badge takes the user to the message viewer 2000. The message viewer has two parts; the top part shows the photo or video 2010 along with an action section for reply, skipping and saving the message 2030. The bottom area shows the profile image of the sender 2026 along with contextual information such as the GPS location 2022 of the sender on the map 2020, information on the music the sender was listening to (see feature 1144 from FIG. 11), or a specific webpage on the internet they have linked to (see feature 1143 from FIG. 11), if this information is available. The top part of the message viewer 2010 will either show a static photo or a video. In case of a video, the message is eternally looped until the view is exited or the user skips to the next message 2012. The badge 2012 stays active in the message viewer 2000 and shows the remaining amount of messages the user can go through 2022.

Figure 21:
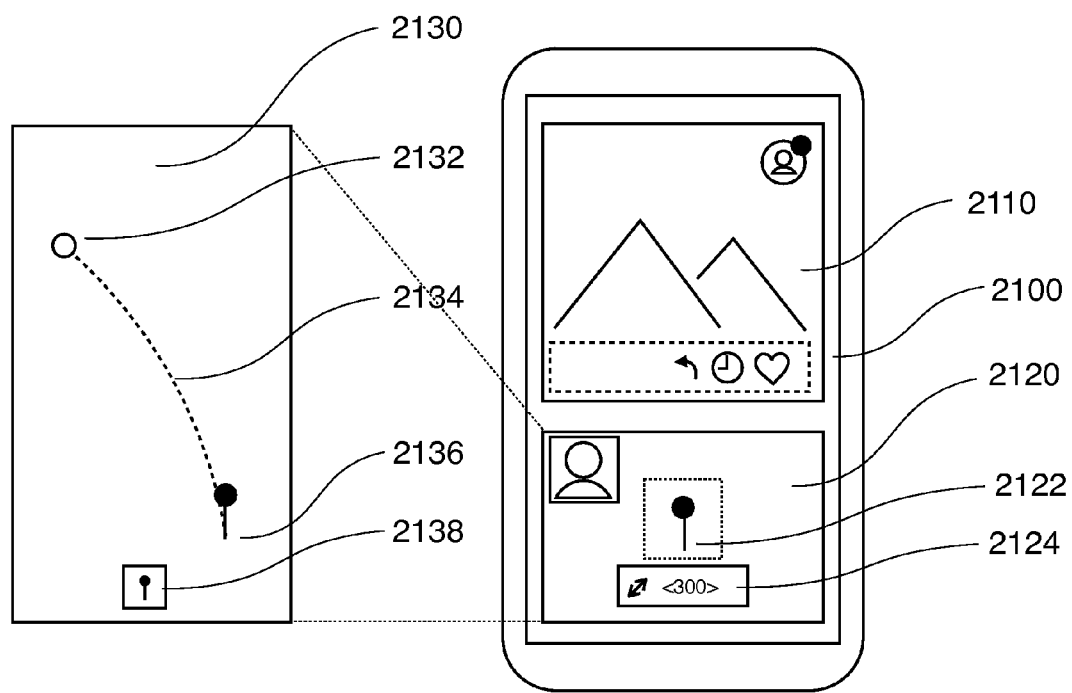
FIG. 21 illustrates an exemplary screen of the main user interface upon toggling the map window to zoom into the sender's location in accordance with exemplary embodiments of the present invention.

Now referring to FIG. 21, an image of an exemplary screen of the main user interface upon viewing the location of the sender in relation to the location of the device in accordance with exemplary embodiments of the present invention is provided.

In an embodiment of the present invention, the bottom area 2120 of the message viewer 2100 is a map that shows of the GPS location where the photo or video 2110 was recorded. Tapping on the map area 2120 will make the map view full screen 2130. A button is present 2124 representing the distance of the device and the position where the photo or video was taken 2122. Tapping the button will open the map 2120 full screen as well 2130, and zooms the map to show the current position of the device 2132 and the position where the photo or video was taken 2136. A line is drawn on the map 2134 in between these points to show the shortest distance between them A return button 2138 will revert to the standard display 2100.

Figure 22:
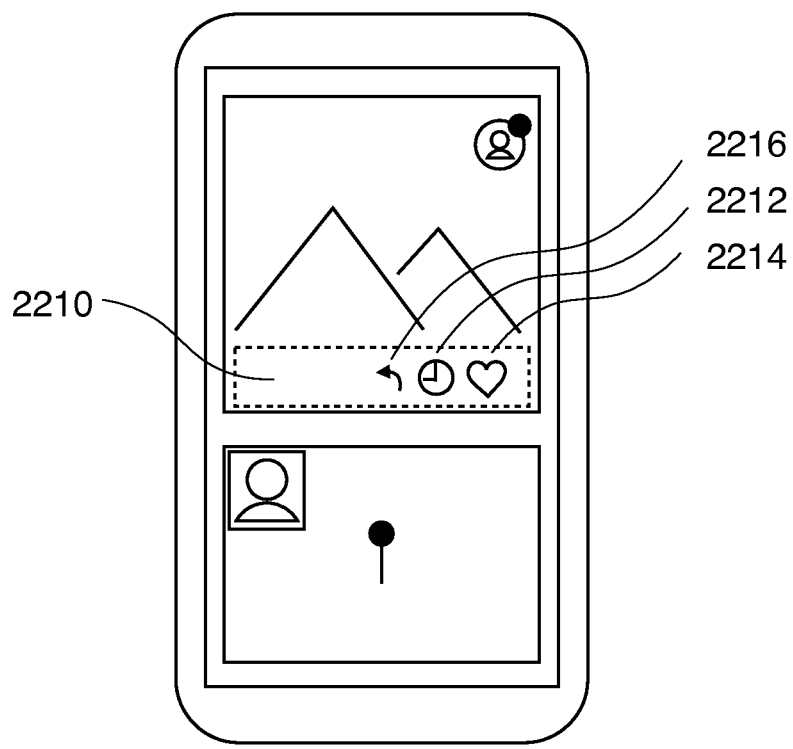
FIG. 22 illustrates an exemplary screen of the main user interface detailing user controls for replying, snoozing and saving a message in accordance with exemplary embodiments of the present invention.

Now referring to FIG. 22, an image of an exemplary screen of the user interface for taking specific actions on an opened message in accordance with exemplary embodiments of the present invention is provided.

In an embodiment of the present invention, the bottom of the photo or video media section of the message contains a horizontal area 2210 devoted to specific user actions 2210 which are represented by specific symbols for replying to the sender of a message 2216, skipping or "snoozing" a message 2212, and a unique model of liking a message 2214 which provides the structure for the original sender to save the message to a shared media collection with the recipient of messages with the recipient.

Figure 23A:
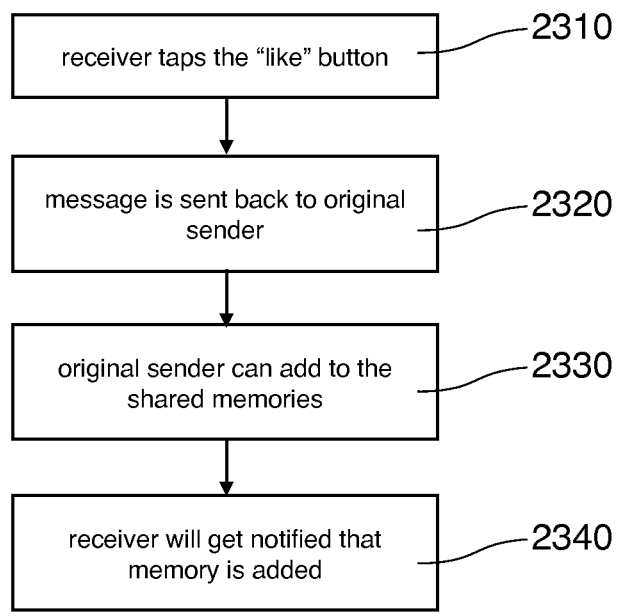
FIGS. 23a-c are flow diagrams illustrating processes for saving a message as a shared "memory" unit of media in accordance with exemplary embodiments of the present invention.

Now referring to FIG. 23a, a flow diagram illustrating how to "like" a message viewed in the inbox to initiate an interaction model for saving the message in a shared media collection between the sender and recipient in accordance with exemplary embodiments of the present invention is provided.

In an embodiment of the present invention, the receiver taps in the actions area of the photo or video message the symbol for "liking" the message (2310). As a result of clicking or tapping the "like" symbol and advancing in the inbox, a notification message in the same format structure as a photo message is sent back to the original sender notifying them that the recipient "liked" their photo or video message (2320). The original sender in this notification message is presented with the option of adding this message to a media collection of saved message or "memories" that is specifically shared between the sender and recipient bidirectionally (2330). If the sender saves the message to the shared media collection, the original recipient will receive a notification message that the original message has now been saved and is viewable in the saved media collection (2340).

Figure 23B:
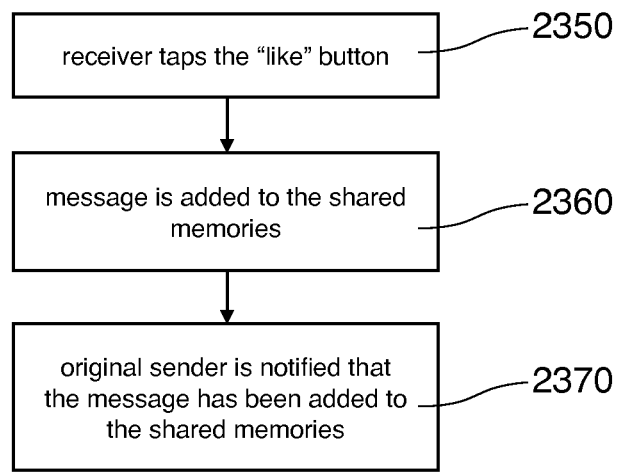

Now referring to FIG. 23b, a flow diagram illustrating how to "like" a message viewed in the inbox and simultaneously save this message in one combined action in a shared media collection between the sender and recipient in accordance with exemplary embodiments of the present invention is provided.

In yet another embodiment of the present invention, the receiver taps in the actions area of the photo or video message the symbol for "liking" the message (2350). As a result of clicking or tapping the "like" symbol and advancing in the inbox, the "liked" message is added to a media collection of saved message or "memories" that is specifically shared between the sender and recipient bidirectionally (2360). The original sender is then presented with a notification message that the original message has now been saved and is viewable in the saved media collection (2370).

Figure 23C:
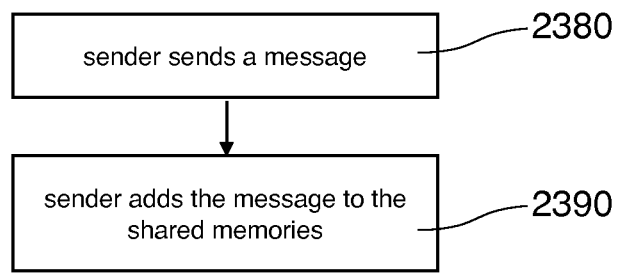

Now referring to FIG. 23c, a flow diagram illustrating how to automatically add sent messages to a shared media collection between the sender and recipient sending in accordance with exemplary embodiments of the present invention is provided.

In yet another embodiment of the present invention, sending a message (2380) automatically adds the message to a shared media collection of saved message or "memories" that is specifically shared between the sender and recipient bidirectionally (2390).

Figure 24:
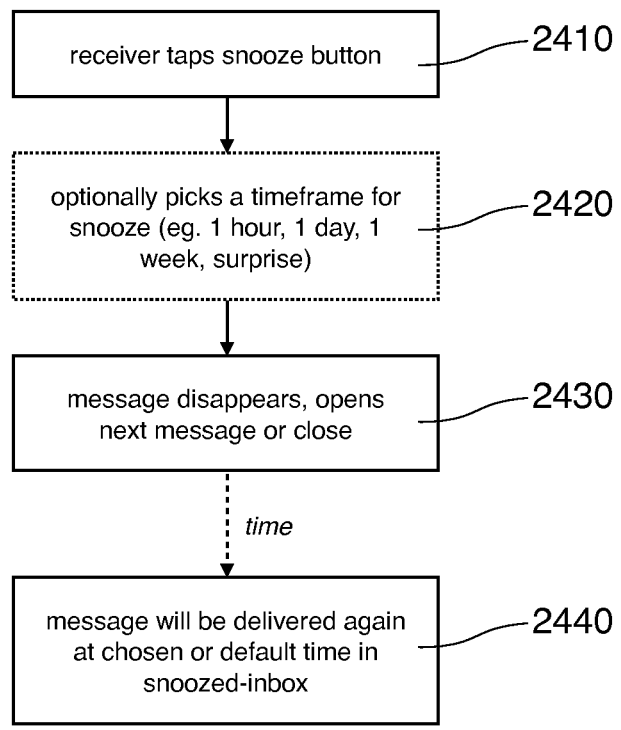
FIG. 24 is a flow diagram illustrating a process for skipping over a message with a time-delayed "snooze" in accordance with exemplary embodiments of the present invention.

Now referring to FIG. 24, a flow diagram illustrating how to skip past or "snooze" a message viewed in accordance with exemplary embodiments of the present invention is provided.

In an embodiment of the present invention, the receiver taps in the actions area of the photo or video message 2210 the symbol for skipping past or "snoozing" the message 2212 2410 without triggering its deletion at the server level 101. As a result of clicking or tapping the "snooze" symbol, a controls interface is presented on the display screen for the user to pick a timeframe for how long to delay the reappearance of the specific message in their primary inbox or a specific inbox of skipped or "snoozed" messages 1810 1812 for instance on the timeframe of an hour, a week a randomly selected time interval, or immediate reappearance 2420. Once the time interval is selected the inbox advances to the next message in the queue or closes and returns back to the primary main user interface 2430 of the viewfinder 400 and the grid 410. Once the selected time interval has elapsed, the original message will be delivered again with an inbox badge notification 1820 in either the primary or a specific inbox of "snoozed" messages 2440.

Figure 25:
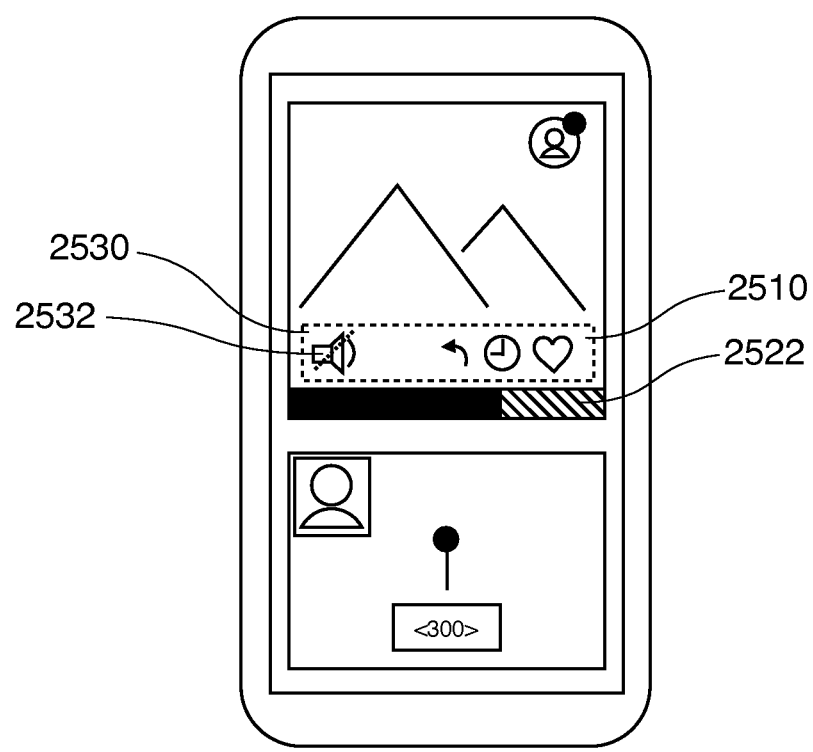
FIG. 25 illustrates an exemplary screen of the user interface detailing user controls for muting device audio while viewing a video message in accordance with exemplary embodiments of the present invention.

Now referring to FIG. 25, an image of an exemplary screen of the user interface for watching a video message in accordance with exemplary embodiments of the present invention is provided.

In an embodiment of the present invention, the bottom of the video media section of a video message 2510 contains a horizontal area devoted to specific user actions 2530. Within this area to the far left is an audio control button 2532, which appears only within video messages that contain audio. Clicking or tapping the audio control button toggles the audio replay through the device's speakers on and off.

Figure 26:
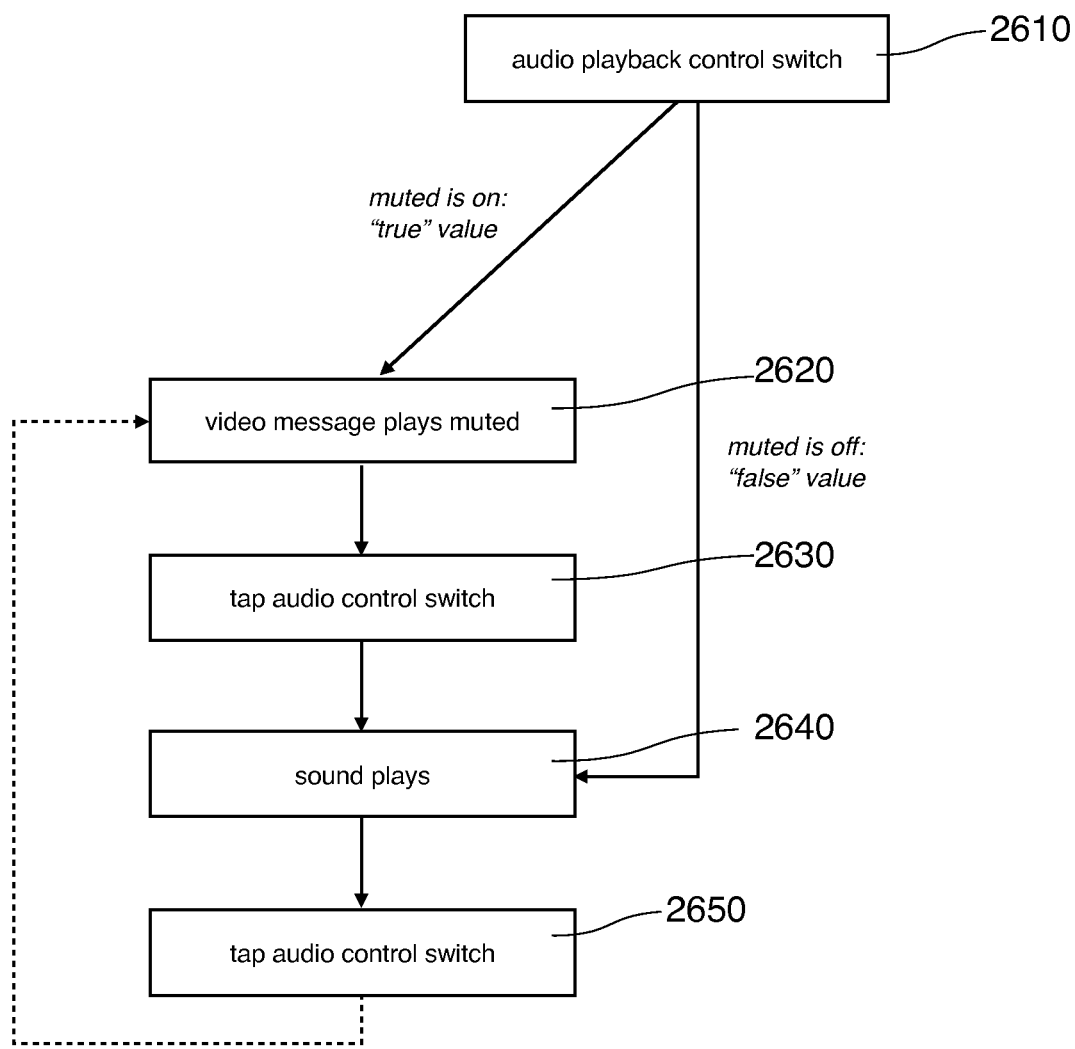
FIG. 26 is a flow diagram illustrating a process for muting the audio of a video message in accordance with exemplary embodiments of the present invention.

Now referring to FIG. 26, a flow diagram illustrating how to toggle audio replay on and off while viewing a video message viewed in accordance with exemplary embodiments of the present invention is provided.

In an embodiment of the present invention, when the audio playback control switch is toggled to the "off" setting ("true" branch from 2610), the device recognizes that playback mute setting is "true" and the video message plays muted (2620). Tapping the audio control switch again (2630) will set the playback mute setting back to "true" and the video message will play muted (2640). Likewise if the audio playback control switch is tapped and toggled to the "on" setting ("false" branch from 2610), the device recognizes that the playback mute setting is "false" and the video message plays with sound through the device's speakers (2640). Tapping the audio control switch again (2650) will set the playback mute setting back to "true" and the video message will play muted (2620).

Figure 27:
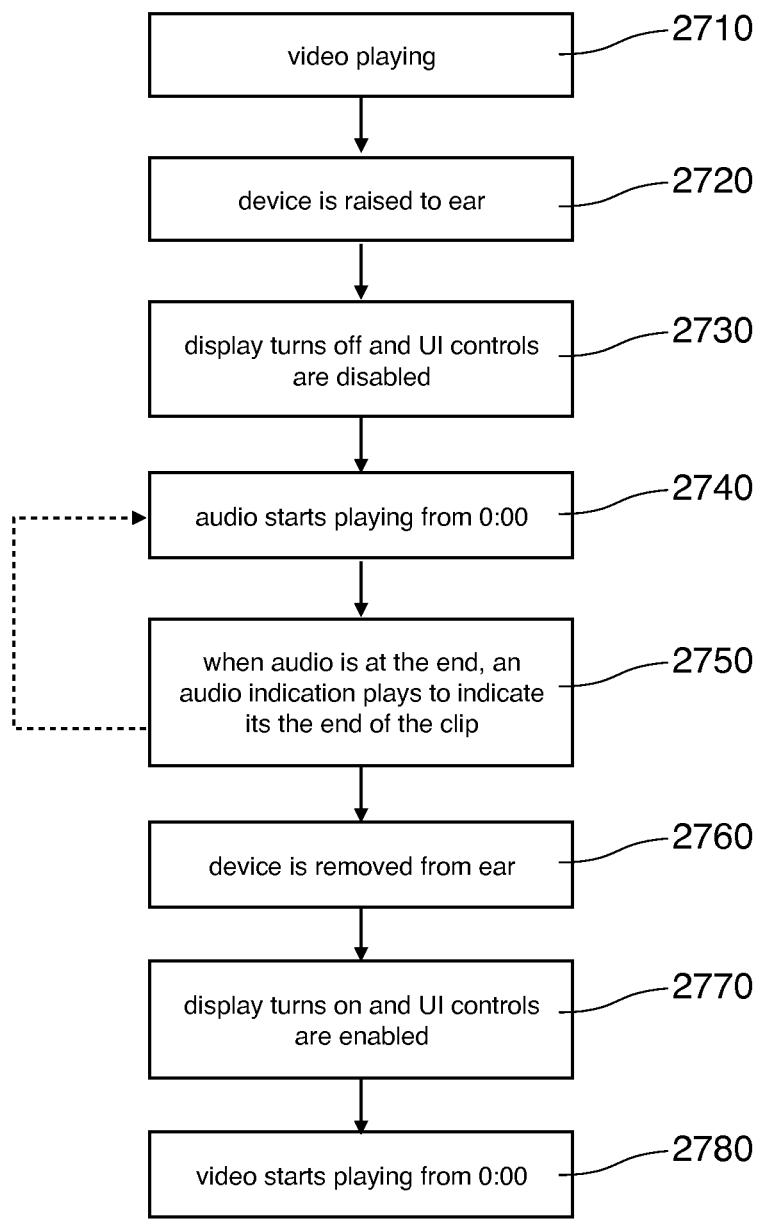
FIG. 27 is a flow diagram illustrating a process for initiating audio-only playback of a video message by holding the in accordance with exemplary embodiments of the present invention.

Now referring to FIG. 27, a flow diagram illustrating how to switch replay of a video message between video playback on the primary device screen and audio speaker and audio-only playback on the device's earpiece speaker in accordance with exemplary embodiments of the present invention is provided.

In an embodiment of the present invention, when the user is watching a video message on loop (2710), the device when raised to the ear will trigger the proximity sensor on the device's display screen (2720). When the proximity sensor is activated, the display screen turns off and the UI controls of the user interface for viewing the video message are disabled (2730). The message switches to audio-only playback beginning from 0:00 (2740) and when the audio playback reaches the end, an audio alert or indication plays to indicate that the message has reached the end (2750) and then the audio starts playing again from 0:00 (loop to 2740 from 2750). When the device is removed the ear (2760) the proximity sensor is deactivated and the display turns on and the primary UI controls for viewing a video message are re-enabled (2770) and the video begins playing on loop from 0:00 (2780).

Figure 28:
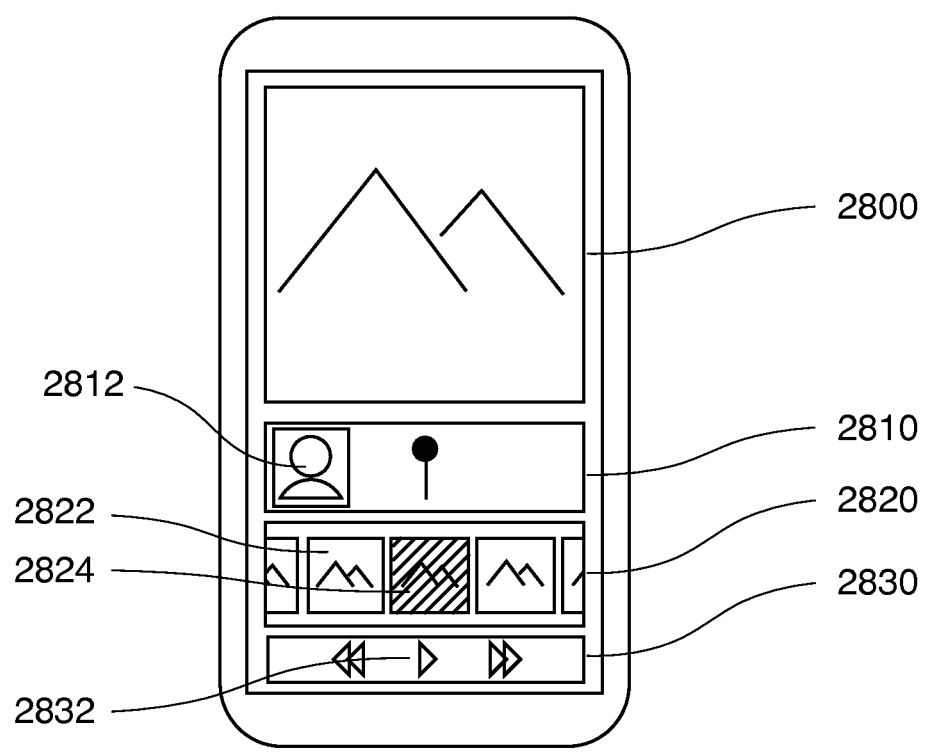
FIG. 28 illustrates an exemplary screen of the user interface detailing user controls for browsing messages saved as shared "memories" with the original sender in accordance with exemplary embodiments of the present invention.

Now referring to FIG. 28, an image of an exemplary screen of the user interface for watching messages in the shared media collection of saved messages between two contacts in accordance with exemplary embodiments of the present invention is provided.

In an embodiment of the present invention, messages saved bidirectionally between two contacts can be viewed in a specific user interface on the device for shared messages or "memories" (as described above with respect to FIG. 23). As shown in FIG. 28, in the middle of the interface is a timeline 2820 of past messages 2822 shared between the user and their contact, where either the user was the sender who saved or the contact was the sender who saved. On opening the memories viewer, the active message 2824 is the beginning of the queue of recent unviewed memories. The user can, at any point, click another message square to select another saved message as the active message on playback 2824. A series of controls are at the bottom of the display 2830 for playing and pausing saved messages 2832 and advancing playback ahead one message and going back one message in the playback in the timeline 2820. The active message is displayed in the primary media section 2800 of the display with the original sender's photo 2812 and the sender's location associated with the message 2810 displayed. As described above with respect to FIG. 21, tapping the location display 2810 can open a display of the sender's past location in full screen showing the distance between the user's current location and the sender's past location at the time.

Figure 29:
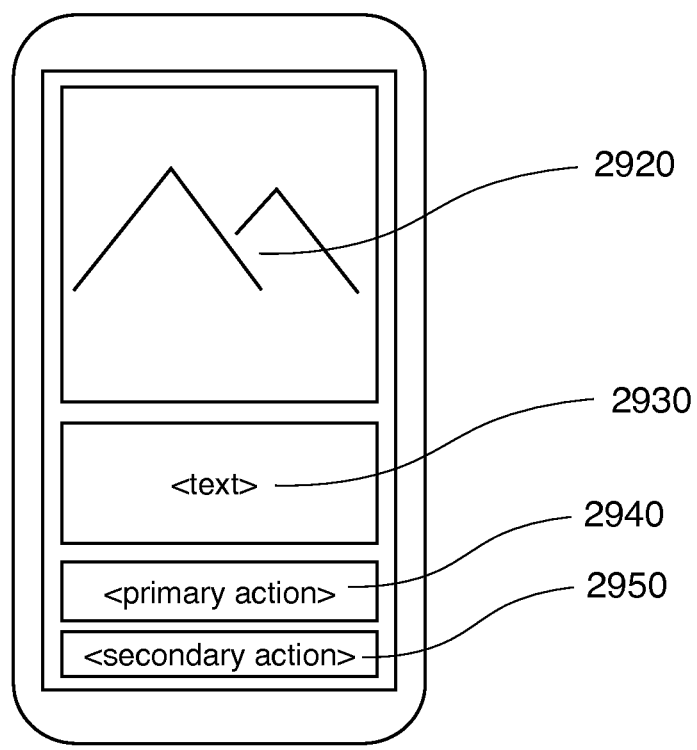
FIG. 29 illustrates an exemplary screen of the user interface for generating custom video messages in accordance with exemplary embodiments of the present invention.

Now referring to FIG. 29, an image of an exemplary screen of the user interface for a custom interactive photo or video message or a "card" in accordance with exemplary embodiments of the present invention is provided.

In an embodiment of the present invention, an interactive photo or video message can be customized and sent to the user as a "call to action" for specific actions. Appearing as an inbox badge in the inboxes area (as described in FIG. 18), clicking the badge will present a custom message of a photo or video in the upper section 2920, an area for a custom text note in the middle 2930, and specific user actions as a series of stacked buttons for primary 2940, secondary 2950, tertiary actions and so on.

Figure 30:
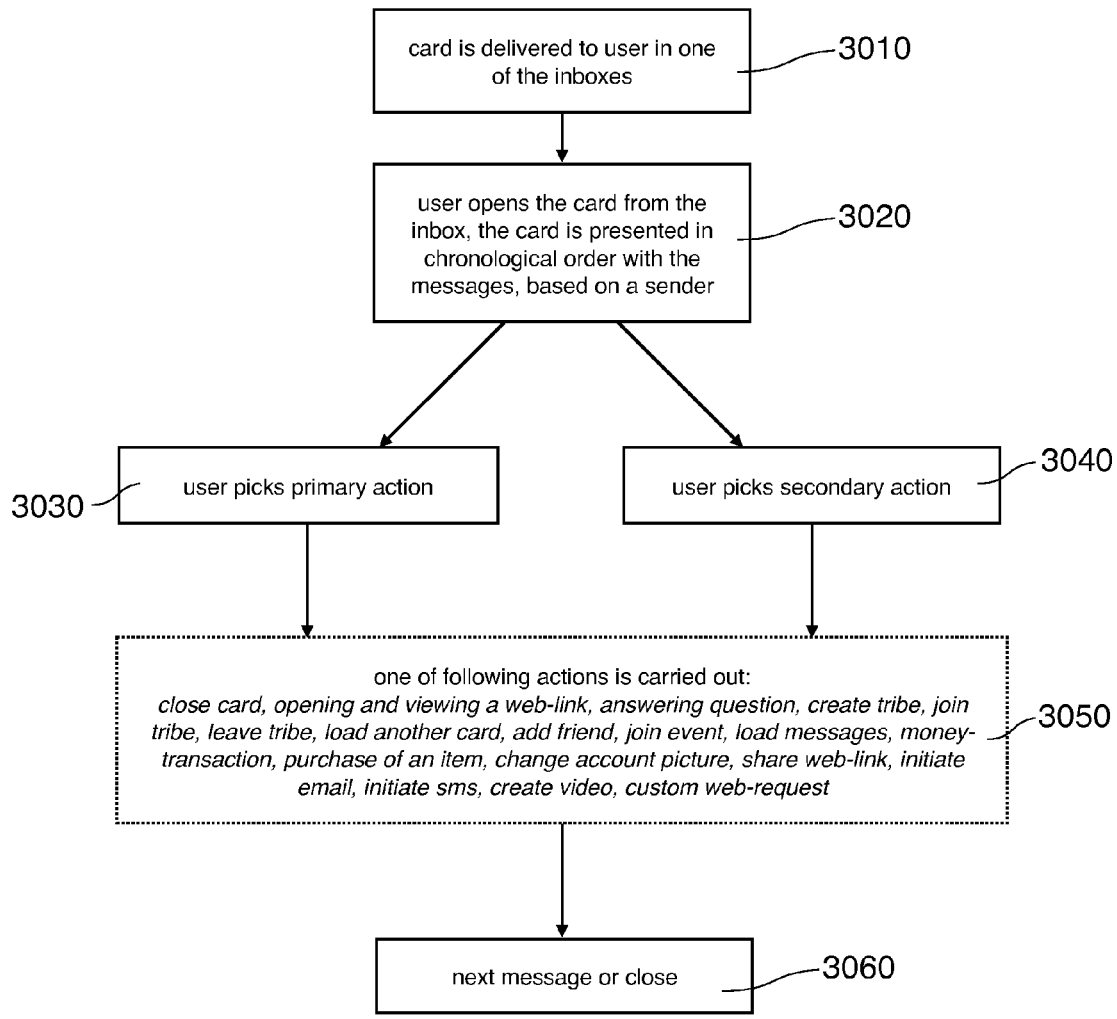
FIG. 30 is a flow diagram illustrating a process for generating custom video messages in accordance with exemplary embodiments of the present invention.

Now referring to FIG. 30, a flow diagram illustrating how to view a customized interactive photo or video message with specific user actions in accordance with exemplary embodiments of the present invention is provided.

In an embodiment of the present invention, the card message is delivered to the user's inbox area and represented as a badge (3010). Clicking the badge opens the card message queue from the specific sender, with each card presented in chronological order (3020). Multiple pre-set action options are presented in the card as a series of stacked buttons. Clicking or tapping on a particular button will select for instance the primary action (3030) or the secondary action (3040) or other available actions in the set, and the corresponding action is carried out—closing the card, opening and viewing a weblink, answering a question, creating a tribe, joining a tribe, loading another card, adding a friend, joining an event, loading messages, initiating a money transaction or purchase, changing an account profile picture, sharing a web-link, initiating an email, initiating an sms, creating a video, or a initiating a custom web-request (3050). With this corresponding action initiated and completed, the active card message is closed and the next card message in the queue is presented or if the active card was the last one in the queue, the message viewing interface closes on the display and returns back to the primary user interface (3060).

Figure 31:
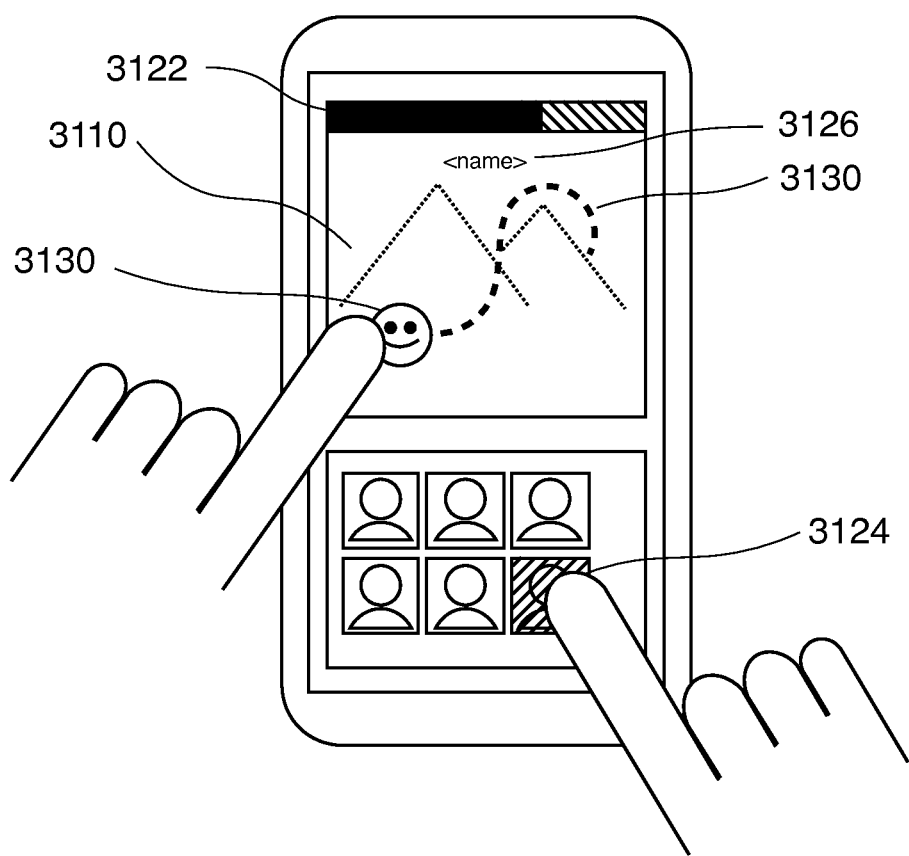
FIG. 31 illustrates an exemplary screen of the user interface for manipulating text and images/icons during the recording of a video message in accordance with exemplary embodiments of the present invention.

Now referring to FIG. 31, an image of an exemplary screen of the main user interface for manipulating text and images/icons during the recording of a video message in accordance with exemplary embodiments of the present invention is provided.

In an embodiment of the present invention, clicking the text input or the icons input on the viewfinder controls area (as described in FIG. 10) brings up an entry interface for inputting in text or an image/icon on the viewfinder screen. Holding down on a contact grid square 3124 in the main user interface will initiate a video as represented by the recording status bar 3122 filling and the name of the contact 3126 appearing on the screen (as described with respect to FIG. 6). With the inputted text and/or image/icon on the viewfinder screen the user can with the finger of their opposing hand tap and drag the text or icon/image 3130 around the screen 3110 while the video continues to record.

Figure 32:
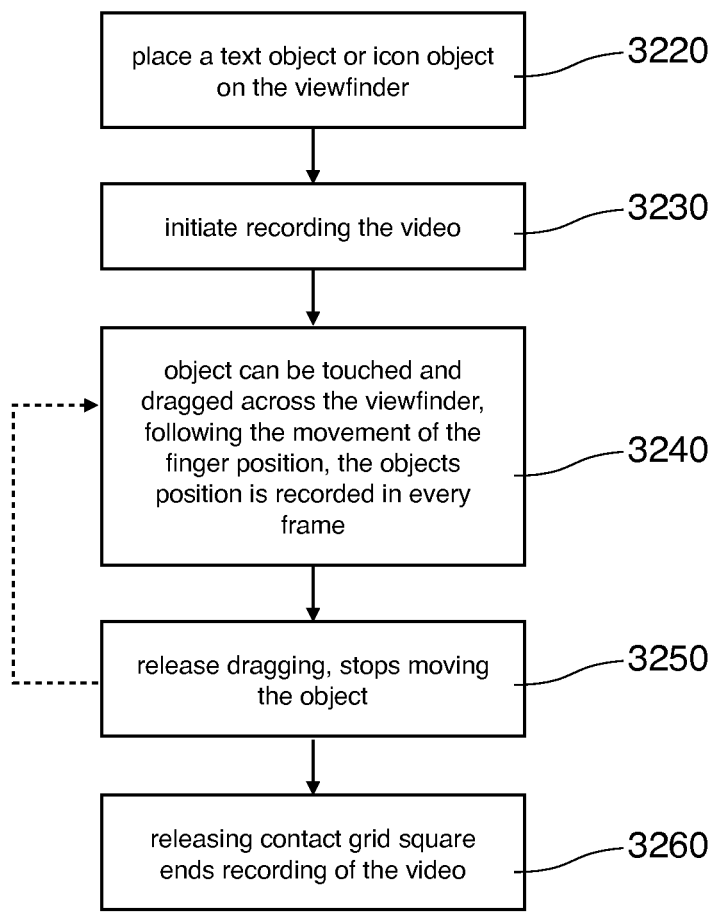
FIG. 32 is a flow diagram illustrating a process for manipulating text and images/icons during the recording of a video message in accordance with exemplary embodiments of the present invention.

Now referring to FIG. 32, a flow diagram illustrating how to manipulate text and images/icons during the recording of a video message in accordance with exemplary embodiments of the present invention is provided.

In an embodiment of the present invention, clicking on the text input or icon/image input icons (as described in FIG. 10) places a text object or an icon object on the viewfinder screen (3220). Holding down the contact square initiates recording a video (3230). At any time in the video recording time window, the object can be touched and dragged across the viewfinder with the object following the movement of the finger position and the object and its position recorded in every frame (3240). Releasing one's opposing finger from the object and releasing it from dragging will stop the object's movement across the viewfinder (3250). Releasing one's finger from holding down the contact square terminates the video recording and begins transmission of the video (3260).

Figure 33A:
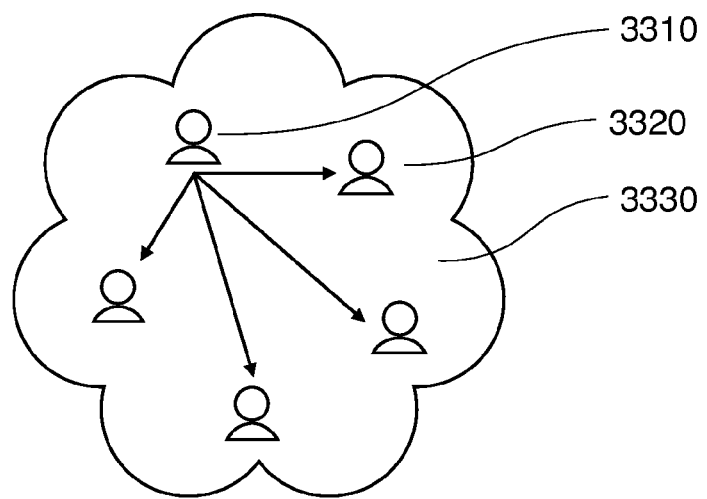
FIG. 33a illustrates user groups in accordance with exemplary embodiments of the present invention.
Figure 33B:
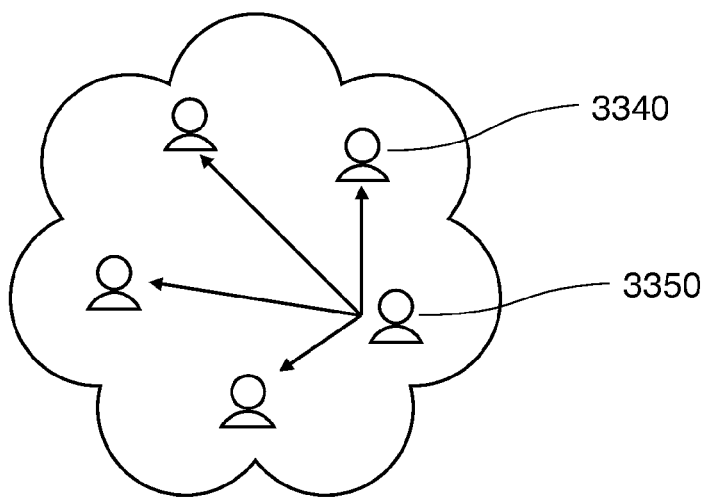
FIG. 33b illustrates user groups in accordance with exemplary embodiments of the present invention.

Now referring to FIG. 33a-b, an architecture for groups or "tribes" in accordance with exemplary embodiments of the present invention is provided.

In an embodiment of the present invention, a groups or tribe 3330 is made up of contacts who have established 1-to-1 ties to one another. When a sender 3310 sends a message to the group 3330 by tapping or holding the group grid square in the primary user interface (as described above with respect to FIG. 4 and following) a photo or video message is sent to each of the other members of the group 3330 as receivers 3320. Likewise, as illustrated in FIG. 33b, should any of the other members 3350 of the group or tribe 3330 want to reply directly to a group message, the response photo or video message will be sent to all of the other members of the tribe as receivers 3340.

Figure 34A:
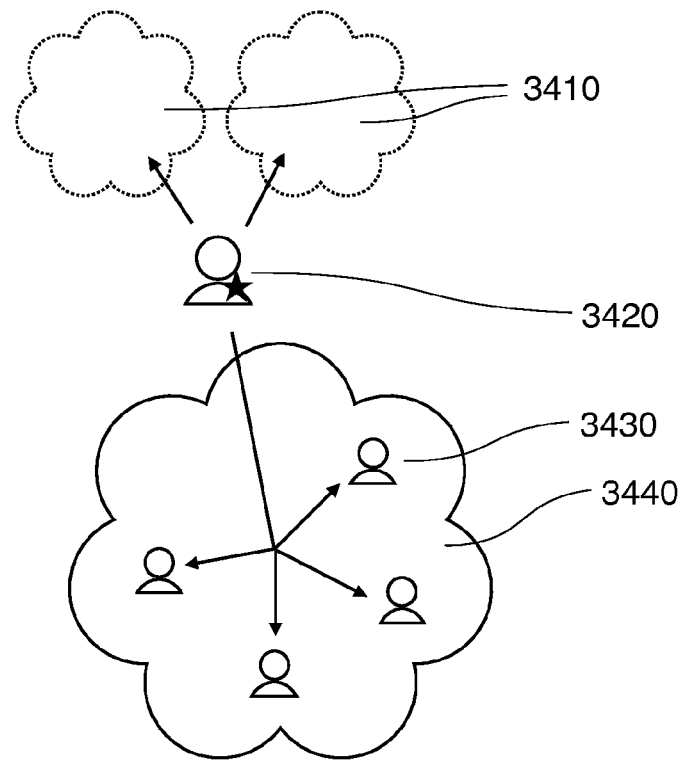
FIG. 34a illustrates user groups in accordance with exemplary embodiments of the present invention.
Figure 34B:
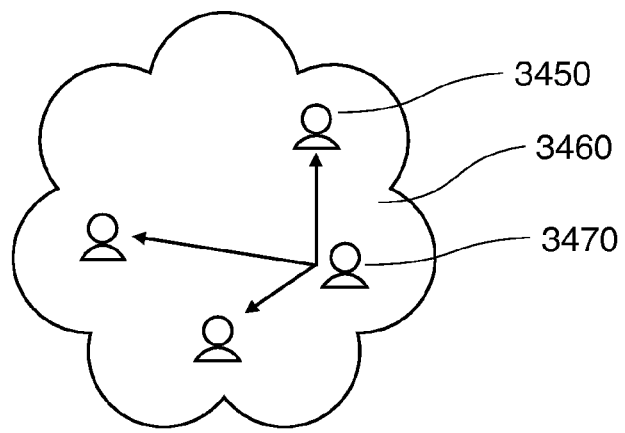
FIG. 34b illustrates user groups in accordance with exemplary embodiments of the present invention.

Now referring to FIG. 34a-b, an architecture for fan groups or fan tribes in accordance with exemplary embodiments of the present invention is provided.

In an embodiment of the present invention, a broadcast sender 3420 can send a photo or video message to multiple tribes that are linked to the sender as fan groups or fan tribes 3410 who each have their own visual identity and name. For example, the sender may be a musician or a national sports franchise's communication team. Each member 3430 of a tribe 3440 linked to the broadcast sender will receive the message. Fan groups or tribes 3460 are made up of contacts who only have established 1-to-1 ties to one another and can send messages between each other as normal for a group, such as each member 3450 of the particular group or tribe receiving a message sent by another member. When a sender 3470 sends a message to the fan group by tapping or holding the fan group grid square in the primary user interface a photo or video message is sent to each of the other members of the group as receivers 3450. However, members of other fan groups or fan tribes do not receive these messages.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMS, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java®, C++, or other object-oriented programming language and development tools. Another embodiment of the invention may be implemented in hard-wired circuitry in place of, or in combination with, machine-executable software instructions.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the methods described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

The invention claimed is:

1. A computer-implemented method, comprising:
simultaneously displaying both:
  a live feed representing visual data captured by a video recording device, and
  a plurality of contact icons, each contact icon associated with one or more destinations to which media data can be sent;
receiving only a single action from a user selecting one of the plurality of the displayed contact icons, wherein the user's single action is touching and holding the selected contact icon on a touch screen; and
in response to the user's single action and not based on any subsequent input from the user, automatically carrying out each of the following steps:
  capturing visual data from the video recording device, wherein the captured visual data is a video clip representing images taken over time, and wherein the video clip is taken over a window of time corresponding to the user's touching and holding the selected contact icon, and
  sending, to the one or more destinations associated with the selected contact icon, the captured visual data.

2. The method of claim 1, further comprising:
receiving a second single action from the user selecting second one of the plurality of the displayed contact icons; and
capturing second visual data from the video recording device, wherein the captured second visual data is a still image.

3. The method of claim 2, wherein the user's second single action is tapping the second one of the plurality of the displayed contact icons on the touch screen.

4. The method of claim 1, further comprising:
during the window of time, receiving further input from the user; and
sending additional data along with the captured visual data based on the further input from the user.

5. The method of claim 4, wherein the additional data is one of image or text generated by the user sent for display superimposed on the captured visual data.

6. The method of claim 1, wherein audio corresponding to the video clip is also sent to the selected one or more destinations along with the video clip.

7. At least one non-transitory processor readable storage medium storing a computer program of instructions configured to be readable by at least one processor for instructing the at least one processor to execute a computer process for performing the method as recited in claim 1.

8. A system, comprising:
a video recording device; and
one or more processors communicatively coupled to a network; wherein the one or more processors are configured to:
 simultaneously display both:
  a live feed representing visual data captured by a video recording device, and
  a plurality of contact icons, each contact icon associated with one or more destinations to which media data can be sent;
 receive only a single action from a user selecting one of the plurality of the displayed contact icons, wherein the user's single action is touching and holding the selected contact icon on a touch screen; and
 in response to the user's single action and not based on any subsequent input from the user, automatically carry out each of the following steps:
  capturing visual data from the video recording device, wherein the captured visual data is a video clip representing images taken over time, and wherein the video clip is taken over a window of time corresponding to the user's touching and holding the selected contact icon, and
  sending, to the one or more destinations associated with the selected contact icon, the captured visual data.

9. The system of claim 8, wherein the one or more processors are further configured to:
 receive a second single action from the user selecting second one of the plurality of the displayed contact icons; and
 capture second visual data from the video recording device, wherein the captured second visual data is a still image.

10. The system of claim 9, wherein the user's second single action is tapping the second one of the plurality of the displayed contact icons on the touch screen.

11. The system of claim 8, further comprising:
 during the window of time, receiving further input from the user; and
 sending additional data along with the captured visual data based on the further input from the user.

12. The system of claim 11, wherein the additional data is one of image or text generated by the user sent for display superimposed on the captured visual data.

13. The system of claim 8, wherein audio corresponding to the video clip is also sent to the selected one or more destinations along with the video clip.

\* \* \* \* \*